(12) United States Patent
Wu

(10) Patent No.: US 11,452,169 B2
(45) Date of Patent: Sep. 20, 2022

(54) PREVENTING INADVERTENT IDLE MODE IN MULTI-NODE CONNECTIVITY ENVIRONMENTS

(71) Applicant: Google LLC, Mountain View, CA (US)

(72) Inventor: Chih-Hsiang Wu, Taoyuan (TW)

(73) Assignee: Google LLC, Mountain View, CA (US)

( * ) Notice: Subject to any disclaimer, the term of this patent is extended or adjusted under 35 U.S.C. 154(b) by 252 days.

(21) Appl. No.: 16/541,047

(22) Filed: Aug. 14, 2019

(65) Prior Publication Data

US 2020/0059991 A1 Feb. 20, 2020

Related U.S. Application Data

(60) Provisional application No. 62/764,806, filed on Aug. 15, 2018.

(51) Int. Cl.
*H04W 76/38* (2018.01)
*H04W 76/27* (2018.01)
*H04W 76/15* (2018.01)

(52) U.S. Cl.
CPC ........... *H04W 76/38* (2018.02); *H04W 76/15* (2018.02); *H04W 76/27* (2018.02)

(58) Field of Classification Search
None
See application file for complete search history.

(56) References Cited

U.S. PATENT DOCUMENTS

| 10,057,937 | B2 | 8/2018 | Zhang et al. |
| 10,218,422 | B2 | 2/2019 | Raghavan et al. |
| 2008/0225843 | A1* | 9/2008 | Sivakumar ............ H04W 76/32 370/389 |
| 2011/0158117 | A1 | 6/2011 | Ho et al. |

(Continued)

FOREIGN PATENT DOCUMENTS

| WO | 2018117928 | 6/2018 |
| WO | 2018130115 | 7/2019 |

OTHER PUBLICATIONS

"3GPP TS 38.321", 3GPP TS 38.321 V15.4.0 (Dec. 2018) 3rd Generation Partnership Project; Technical Specification Group Radio Access Network; NR; Medium Access Control (MAC) protocol specification (Release 15), Dec. 2018, 77 pages.

(Continued)

*Primary Examiner* — Nicholas Sloms
(74) *Attorney, Agent, or Firm* — Colby Nipper PLLC

(57) ABSTRACT

This document describes methods and devices for preventing inadvertent idle mode for a UE in multi-node connectivity with a master node and at least one secondary node. In an implementation, the UE includes first and second Media Access Control (MAC) entities for respectively communicating with a master node and a secondary node. The UE starts or restarts at least one data inactivity timer responsive to detecting a communication of data on at least one of the MAC entities. Rather than inadvertently releasing resources of a node as part of the UE transitioning to an idle mode, thereby potentially ceasing connectivity of active communication with the node, the methods and devices described here prevent this release unless connections to both nodes are inactive. By so doing, degradation to a user's experience and the waste of power, computing, or bandwidth resources may be prevented.

20 Claims, 9 Drawing Sheets

(56) References Cited

U.S. PATENT DOCUMENTS

| | | | | |
|---|---|---|---|---|
| 2011/0249575 | A1* | 10/2011 | Dwyer | H04W 76/27 370/252 |
| 2013/0070614 | A1* | 3/2013 | Somasundaram | H04L 1/1877 370/242 |
| 2015/0146599 | A1* | 5/2015 | Jha | H04L 1/0026 370/311 |
| 2015/0195795 | A1* | 7/2015 | Loehr | H04W 52/365 455/522 |
| 2016/0135095 | A1* | 5/2016 | Wu | H04W 36/0061 370/328 |
| 2016/0219475 | A1* | 7/2016 | Kim | H04W 36/04 |
| 2016/0323832 | A1 | 11/2016 | Love et al. | |
| 2017/0064769 | A1* | 3/2017 | Zhang | H04W 76/25 |
| 2017/0078333 | A1 | 3/2017 | Tevlin | |
| 2017/0127473 | A1* | 5/2017 | Virtej | H04W 76/38 |
| 2018/0063300 | A1* | 3/2018 | Chiu | H04L 1/0083 |
| 2018/0213452 | A1* | 7/2018 | Kim | H04L 5/0053 |
| 2018/0324641 | A1* | 11/2018 | Tsai | H04L 69/321 |
| 2019/0028959 | A1* | 1/2019 | Svedevall | H04W 28/0289 |
| 2019/0037635 | A1* | 1/2019 | Guo | H04W 76/19 |
| 2019/0045577 | A1* | 2/2019 | Kim | H04W 76/28 |
| 2019/0081657 | A1 | 3/2019 | Zeng et al. | |
| 2019/0166519 | A1* | 5/2019 | Kunt | H04W 72/14 |
| 2019/0166529 | A1* | 5/2019 | Chen | H04L 5/0096 |
| 2019/0182716 | A1* | 6/2019 | Futaki | H04W 76/27 |
| 2019/0200396 | A1* | 6/2019 | Agiwal | H04L 5/0098 |
| 2019/0261424 | A1* | 8/2019 | Park | H04W 72/085 |
| 2019/0319833 | A1* | 10/2019 | Nagaraja | H04B 7/0695 |
| 2019/0357085 | A1* | 11/2019 | Chervyakov | H04W 36/06 |
| 2020/0007281 | A1* | 1/2020 | Kilinc | H04L 5/0032 |
| 2020/0037345 | A1* | 1/2020 | Ryoo | H04W 72/1284 |
| 2020/0154442 | A1 | 5/2020 | Zhou | |
| 2020/0358570 | A1* | 11/2020 | Liu | H04L 69/22 |

OTHER PUBLICATIONS

"3GPP TS 38.331", 3GPP TS 38.331 3rd Generation Partnership Project; Technical Specification Group Radio Access Network; NR; Radio Resource Control (RRC) protocol specification (Release 15) V15.4.0 (Dec. 2018), Dec. 2018, 474 pages.

"3GPP TSG-RAN WG2#104", 3GPP TSG-RAN WG2#104; Tdoc R2-1818429; Spokane, USA, Nov. 12-16, 2018, Nov. 2018, 3 pages.

"3GPP TSG-WG2 Meeting #102", 3GPP TSG-WG2 Meeting #102; R2-1809239; Busan, South Korea, May 21-25, 2018, May 2018, 448 pages.

"UE Overheating for EN-DC", 3GPP R2-1802414, UE overheating for EN-DC, in 3GPP TSG-RAN WG2 Meeting #101, Apple Inc., Mar. 2, 2018, 3 pages.

Wu, "Handling Overheating in a Wireless-Communication Device", Technical Disclosure Commons; Retrieved from https://www.tdcommons.org/dpubs_series/2343, Jul. 12, 2019, 22 pages.

"3GPP TS 24.501 V16.3.0", 3GPP TS 24.501 version 16.3.0, Dec. 2019, 645 pages.

"3rd Generation Partnership Project; Technical Specification Group Services and System Aspects; Security architecture and procedures for 5G system", 3GPP TS 33.501 version 16.1.0 Release 16, Dec. 2019, 202 pages.

"5G; Non-Access-Stratum (NAS) protocol for 5G System (5GS); Stage 3", 3GPP TS 24.501 version 15.1.0 Release 15, Oct. 2018, 406 pages.

"LTE; Evolved Universal Terrestrial Radio Access (E-UTRA); Medium Access Control (MAC) protocol specification (3GPP TS 36.321 version 15.8.0 Release 15)", ETSI TS 136 321 V15.8.0 (Jan. 2020), Jan. 2020, 137 pages.

"Third Generation Partnership Project; Technical Specification Group Services and System Aspects; Service requirements for the 5G system; Stage 1", 3GPP TS 22.261 version 16.10.0 Release 16, Dec. 2019, 72 pages.

Aboba, et al., "Extensible Authentication Protocol (EAP)", RFC Editor; Retrieved from https://www.rfc-editor.org/info/rfc3748, Jun. 2004, 67 pages.

Klingenbrunn, et al., "Power Backoff Mechanism for Intermodulation Distortion and Harmonic Distortion", Technical Disclosure Commons; Retrieved from https://www.tdcommons.org/dpubs_series/3424, Jul. 13, 2020, 13 pages.

Lin, et al., "Handling of Extensible Authentication Protocol Based Non-Access Stratum Authentication Failures", Technical Disclosure Commons; Retrieved from https://www.tdcommons.org/dpubs_series/3191, Apr. 23, 2020, 11 pages.

Son, "7 Deployment Scenarios of Private 5G Networks", Netmanias; Retrieved from https://www.netmanias.com/en/post/blog/14500/5g-edge-kt-sk-telecom/7-deployment-scenarios-of-private-5g-networks, Oct. 21, 2019, 11 pages.

\* cited by examiner

PREVENTING INADVERTENT IDLE MODE IN MULTI-NODE CONNECTIVITY ENVIRONMENTS

RELATED APPLICATION

This application claims priority under 35 U.S.C. § 119(e) to U.S. Provisional Patent Application 62/764,806, filed on Aug. 15, 2018, the disclosure which is incorporated herein by reference in its entirety.

BACKGROUND

The evolution of wireless communication to Fifth Generation (5G) standards and technologies provides higher data rates and greater capacity with improved reliability and lower latency, which enhances mobile broadband services. Fifth Generation technologies also provide new classes of service for vehicular networking, fixed wireless broadband, and the Internet of Things (IoT). The specification of the features in the 5G air interface are defined as 5G New Radio (5G NR).

To communicate wirelessly with a network, a user equipment (UE) may establish a connection to the network through at least one node (e.g., a base station, a serving cell) that supports a Fifth Generation Core Network (5GC). In some situations, the UE can use multi-node connectivity (e.g., dual connectivity) to connect to multiple nodes at a time. By connecting to multiple nodes, performance improvements in user throughput, mobility robustness, and/or load balancing can be realized. The multiple nodes can be associated with the same radio access technology (RAT) or different RATs.

Wireless communication protocols today (e.g., 3GPP LTE protocols, 5G NR protocols, and so forth) used for cellular networks, for example, do not adequately address data inactivity in multi-node connectivity environments. For example, conventional techniques for E-UTRA communications specify the use of a single Media Access Control entity (MAC entity), namely, an E-UTRA MAC entity. A problem can arise, in a multi-node connectivity environment with a UE in dual connectivity with an E-UTRA base station (a master node) and a 5G NR base station (a secondary node), upon the data inactivity timer for the E-UTRA MAC entity expiring. In such a situation, the UE will transition from a connected mode at the radio resource control (RRC) layer (e.g., RRC_CONNECTED) to an idle mode at the radio resource control layer (e.g., RRC_IDLE) and will release all air interface resources with both the E-UTRA master node and the 5G NR secondary node, even if the UE was communicating with the 5G NR secondary node. This release of radio resources results in the inadvertent disconnection of the UE from the 5G NR network.

SUMMARY

This summary is provided to introduce simplified concepts for preventing inadvertent idle mode for a user equipment (UE) in multi-node connectivity environments. For instance, UE may be in dual connectivity with both a master node (e.g., a 5G new radio (NR) base station) providing access to a master cell group (e.g., a 5G wireless network) and a secondary node (e.g., an E-UTRA base station) providing access to a secondary cell group (e.g., an E-UTRA wireless network). The Detailed Description, below, further describes the simplified concepts. This summary is not intended to identify essential features of the claimed subject matter, nor is it intended for use in determining the scope of the claimed subject matter.

Techniques, methods, devices, systems, and apparatuses are described herein for preventing inadvertent idle mode for a UE in multi-node connectivity environments.

Aspects described below include, a method for preventing an inadvertent idle mode for a user equipment (UE) in a multi-node connectivity environment. The UE connects, through multi-node connectivity, to a master node (MN) and a secondary node (SN). The UE includes a first Media Access Control (MAC) entity for communicating with the MN and a second MAC entity for communicating with the SN. At least one of the MN or the SN comprises a Fifth Generation New Radio (5G NR) base station. The UE operates in a connected mode at a radio resource control (RRC) layer. The UE detects a first communication of data on at least one of the first MAC entity or the second MAC entity. The UE starts or restarts a dual-data inactivity timer responsive to the detecting of the first communication. Prior to the dual-data inactivity timer expiring, the UE detects at least one second communication of data on at least one of the first MAC entity or the second MAC entity. The UE starts or restarts the dual-data inactivity timer responsive to the detecting of the at least one second communication of data. Responsive to the dual-data inactivity timer expiring, the UE releases the connections to both the MN and the SN, and transitions from the connected mode at the RRC layer to an idle mode at the RRC layer.

Aspects described below include an apparatus including a processor; one or more transceivers, and a computer-readable storage media having stored thereon instructions that, responsive to execution by the processor, cause the processor to perform operations. The apparatus connects, through multi-node connectivity, to a master node (MN) and a secondary node (SN). The apparatus includes a first Media Access Control (MAC) entity for communicating with the MN and a second MAC entity for communicating with the SN. At least one of the MN or the SN is a Fifth Generation New Radio (5G NR) base station. The apparatus operates in a connected mode at a radio resource control (RRC) layer and detects a first communication of data on at least one of the first MAC entity or the second MAC entity. The apparatus starts or restarts a dual-data inactivity timer responsive to the detecting of the first communication. Prior to the dual-data inactivity timer expiring, the apparatus detects at least one second communication of data on at least one of the first MAC entity or the second MAC entity, and the apparatus starts or restarts the dual-data inactivity timer responsive to the detecting of the at least one second communication of data. Responsive to the dual-data inactivity timer expiring, the apparatus releases the connections to both the MN and the SN, and transitions from the connected mode at the RRC layer to an idle mode at the RRC layer.

Aspects described below include a method for preventing an inadvertent idle mode for a UE in a multi-node connectivity environment. The UE connects, through multi-node connectivity, to a master node (MN) and a plurality of secondary nodes (SN). The UE includes a Media Access Control (MAC) entity for communicating with the MN and each of the SN. At least one of the MN or the SN is a Fifth Generation New Radio (5G NR) base station. The UE operates in a connected mode at a radio resource control (RRC) layer and detects a first communication of data on at least one of the MAC entities. The UE starts or restarts a multi-data inactivity timer responsive to the determining of the first communication. Prior to the multi-data inactivity timer expiring, the UE detect at least one second communication of data on a different MAC entity than the first communication and starts or restarts the multi-data inactivity timer responsive to the detecting of the at least one second communication of data. Responsive to the multi-data inactivity timer expiring, the UE releases the connections to the MN and the SN, and transitions from the connected mode at the RRC layer to an idle mode at the RRC layer.

BRIEF DESCRIPTION OF THE DRAWINGS

Techniques, methods, devices, systems, and apparatuses for preventing inadvertent idle mode for a user equipment (UE) in multi-node connectivity environments are described with reference to the following drawings. The same numbers are used throughout the drawings to reference like features and components.

DETAILED DESCRIPTION

Overview

This document describes methods and devices for preventing inadvertent idle mode for a user equipment (UE) in multi-node connectivity environments (e.g., dual connectivity environments). Multi-node connectivity environments are commonplace for UE, including UE configured for 5G New Radio (5G NR) connectivity, as these devices commonly also have E-UTRA connectivity.

As described above, conventional techniques do not adequately address multi-node connectivity environments for UE. Rather than releasing resources of connected base stations as part of transitioning to an idle mode at the radio resource control layer, thereby ceasing connectivity of potentially active communication with a base station, the methods and devices described here prevent this release unless connections to both base stations are inactive. By preventing resource release unless both connections are inactive, a user of the UE does not experience interruptions in service, and power resources, computing resources, and/or bandwidth resources are preserved.

To address this and other potential issues with inadvertent idle mode for a UE in multi-node connectivity environments, this document describes methods and devices to prevent inadvertent idle mode and the resulting release of resources. While features and concepts of the described systems and methods for preventing inadvertent idle mode for a UE in multi-node connectivity environments can be implemented in any number of different environments, systems, and/or devices, aspects of these techniques are described in the context of the following example devices and systems.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, "e.g.," "etc.," "for instance," "for example," and "or," and grammatically related terms, indicates non-exclusive alternatives without limitation, unless the context clearly dictates otherwise. As used herein, the use of "including" and grammatically related terms means "including, but not limited to," unless the context clearly dictates otherwise. As used herein, the use of the articles "a," "an" and "the" are meant to be interpreted as referring to the singular as well as the plural, unless the context clearly dictates otherwise.

Example Environment

Figure 1:
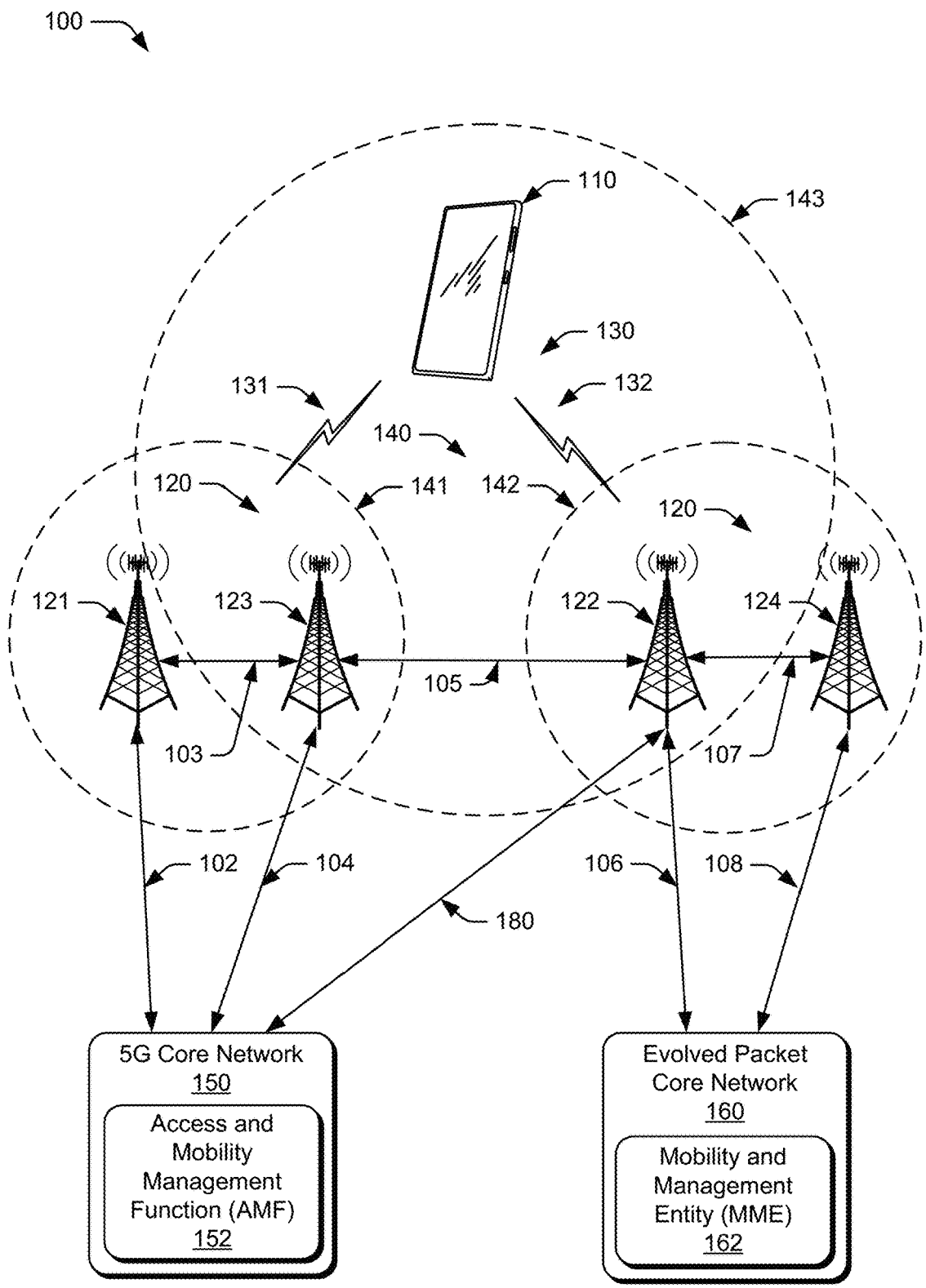
FIG. 1 illustrates an example wireless network environment in which various aspects of preventing inadvertent idle mode for a UE in multi-node connectivity environments can be implemented.

FIG. 1 is an illustration of an example wireless network environment 100 in which various aspects of preventing inadvertent idle mode for a user equipment in multi-node connectivity environments may be implemented. In the example environment 100, a user equipment 110 (UE 110) communicates with base stations 120 (illustrated as base stations 121, 122, 123, and 124) through one or more wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, Next Generation eNB (ng-eNB), or the like) may be implemented in a macrocell, microcell, small cell, picocell, or the like, or any combination thereof.

The base stations 120 communicate with the UE 110 using the wireless links 131 and 132, which may be implemented as any suitable type of wireless link. The wireless links 131 and 132 include control and data communication, such as a downlink of data and control information communicated from the base stations 120 to the UE 110, uplink of other data and control information communicated from the UE 110 to the base stations 120, or both. The wireless links 130 may include wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

Multiple wireless links 131 from the base stations 121 and 123 may be aggregated in dual connectivity to provide a higher data rate for the UE 110. Multiple wireless links 132 from the base stations 122 and 124 may be aggregated in dual connectivity to provide a higher data rate for the UE 110. Multiple wireless links 130 from the base stations 121 and 122 may be aggregated in dual connectivity to provide a higher data rate for the UE 110. While FIG. 1 illustrates, in dotted-line circles, coverage of base stations 120 at NR RAN 141 and E-UTRAN 142, in multi-node connectivity environments these coverages intersect, which FIG. 1 illustrates as multi-node connectivity RAN 143.

The base stations 120 are collectively a Radio Access Network 140 (e.g., RAN 140, Evolved Universal Terrestrial Radio Access Network, E-UTRAN, 5G NR RAN, NR RAN). FIG. 1 illustrates the RANs 140 as an NR RAN 141 and an E-UTRAN 142. The base stations 121 and 123 in the NR RAN 141 connect to a Fifth Generation Core 150 (5GC 150) network. The base stations 122 and 124 in the E-UTRAN 142 connect to an Evolved Packet Core 160 (EPC 160). Optionally or additionally, a base station 122 in the E-UTRAN 142 may connect to the 5GC 150 and EPC 160 networks.

The base stations 121 and 123 connect, at 102 and 104 respectively, to the 5GC 150 through an NG2 interface for control-plane signaling and using an NG3 interface for user-plane data communications. The base stations 122 and 124 connect, at 106 and 108 respectively, to the EPC 160 using an S1 interface for control-plane signaling and user-plane data communications. Optionally or additionally, if the base station 122 connects to the 5GC 150 and EPC 160 networks, the base station 122 connects to the 5GC 150 using an NG2 interface for control-plane signaling and through an NG3 interface for user-plane data communications, at 180.

In addition to connections to core networks, the base stations 120 may communicate with each other. For example, the base stations 121 and 123 communicate through an Xn interface at 103, the base stations 122 and 123 communicate through an Xn interface at 105, and the base stations 122 and 124 communicate through an X2 interface at 107.

The 5GC 150 includes an Access and Mobility Management Function 152 (AMF 152), which provides control-plane functions, such as registration and authentication of multiple UE 110, authorization, and mobility management in the 5G NR network. The EPC 160 includes a Mobility and Management Entity 162 (MME 162), which provides control-plane functions, such as registration and authentication of multiple UE 110, authorization, or mobility management in the E-UTRA network. The AMF 152 and the MME 162 communicate with the base stations 120 in the RANs 140 and also communicate with multiple UE 110, using the base stations 120.

The base stations 121 and 123 do not need the 5GC 150 for the operation of EUTRA-NR dual connectivity (EN-DC). The base stations 122 and 124 do not need the EPC 160 for the operation of Next Generation EN-DC (NGEN-DC) or for the operation of NR-EUTRA dual connectivity (NE-DC).

Example Devices

Figure 2:
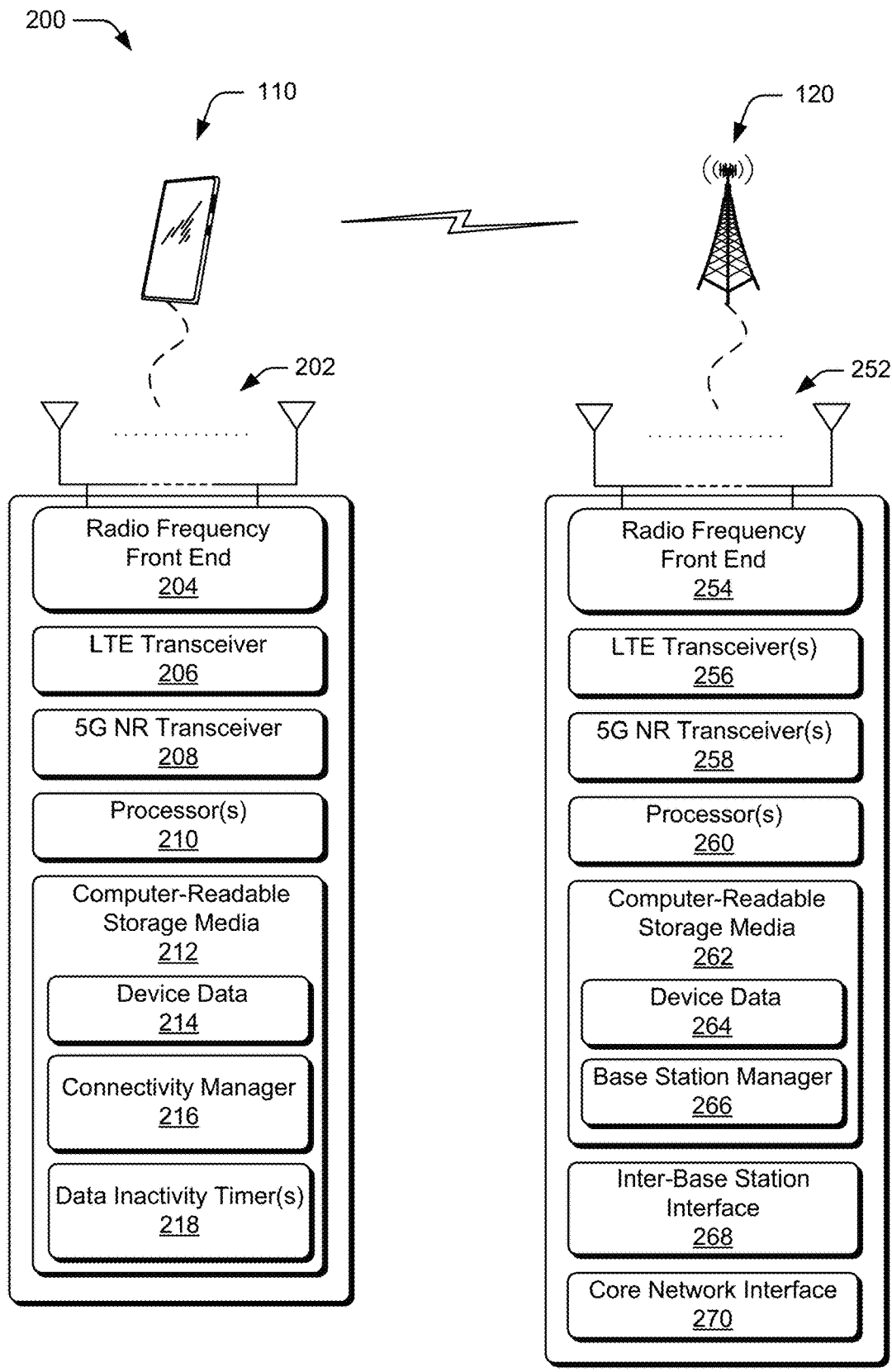
FIG. 2 illustrates an example device diagram for devices that can implement various aspects of preventing inadvertent idle mode for a UE in multi-node connectivity environments.

FIG. 2 illustrates an example device diagram 200 of the UE 110 and the base station 120. The UE 110 and the base station 120 may include additional functions and interfaces that are omitted from FIG. 2 for the sake of clarity. The UE 110 includes antennas 202, a radio frequency front end 204 (RF front end 204), an LTE transceiver 206, and a 5G NR transceiver 208 for communicating with the base station 120 in the 5G RAN 141 and/or the E-UTRAN 142. The RF front end 204 of the UE 110 can couple or connect the LTE transceiver 206 and the 5G NR transceiver 208 to the antennas 202 to facilitate various types of wireless communication. The antennas 202 of the UE 110 may include an array of multiple antennas that are configured similar to or different from each other. The antennas 202 and the RF front end 204 can be tuned to, and/or be tunable to, frequency bands defined by the 3GPP LTE and 5G NR communication standards and implemented by the LTE transceiver 206 and/or the 5G NR transceiver 208. Additionally, the antennas 202, the RF front end 204, the LTE transceiver 206, and/or the 5G NR transceiver 208 may be configured to support beamforming for the transmission and reception of communications with the base station 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards.

The UE 110 also includes processor(s) 210 and computer-readable storage media 212 (CRM 212). The processor(s) 210 may be a single-core processor or a multiple-core processor composed of a variety of materials, such as silicon, polysilicon, high-K dielectric, copper, and so on. The computer-readable storage media described herein excludes propagating signals. CRM 212 may include any suitable memory or storage device such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beamforming codebooks, applications, and/or an operating system of the UE 110, which are executable by the processor(s) 210 to enable user-plane communication, control-plane signaling, and user interaction with the UE 110.

CRM 212 also includes a connectivity manager 216. The connectivity manager 216 can include one or more data inactivity timer(s) 218. Alternatively or additionally, the connectivity manager 216 may be implemented in whole or part as hardware logic or circuitry integrated with or separate from other components of the UE 110. In at least some aspects, the connectivity manager 216 configures a radio resource control layer (e.g., RRC layer 324 of FIG. 3) and elements in a Media Access Control layer (e.g., MAC entity 340 of FIG. 3) to implement the techniques to prevent inadvertent idle mode for a UE 110 in multi-node connectivity environments.

The device diagram for the base station 120, illustrated in FIG. 2, includes a single network node (e.g., a gNode B). The functionality of the base station 120 may be distributed across multiple network nodes or devices and may be distributed in any fashion suitable to perform the functions described herein. The base station 120 includes antennas 252, a radio frequency front end 254 (RF front end 254), LTE transceiver(s) 256, and/or 5G NR transceiver(s) 258 for communicating with the UE 110. The RF front end 254 of the base station 120 can couple or connect the LTE transceiver(s) 256 and the 5G NR transceiver(s) 258 to the antennas 252 to facilitate various types of wireless communication. The antennas 252 of the base station 120 may include an array of multiple antennas that are configured similar to or different from each other. The antennas 252 and the RF front end 254 can be tuned to, and/or be tunable to, one or more frequency band defined by the 3GPP LTE and 5G NR communication standards, and implemented by the LTE transceiver(s) 256, and/or the 5G NR transceiver(s) 258. Additionally, the antennas 252, the RF front end 254, the LTE transceiver(s) 256, and/or the 5G NR transceiver(s) 258 may be configured to support beamforming, such as Massive-MIMO, for the transmission and reception of communications with the UE 110.

The base station 120 also includes processor(s) 260 and computer-readable storage media 262 (CRM 262). The processor(s) 260 may be a single-core processor or a multiple-core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data 264 of the base station 120. The device data 264 includes network scheduling data, radio resource management data, beamforming codebooks, applications, and/or an operating system of the base station 120, which are executable by the processor(s) 260 to enable communication with the UE 110.

CRM 262 also includes a base station manager 266. Alternatively or additionally, the base station manager 266 may be implemented in whole or part as hardware logic or circuitry integrated with or separate from other components of the base station 120. In at least some aspects, the base station manager 266 configures the LTE transceivers 256 and the 5G NR transceivers 258 for communication with the UE 110, as well as communication with a core network. The base station 120 includes an inter-base station interface 268, such as an Xn and/or X2 interface, which the base station manager 266 configures to exchange user-plane and control-plane data with another base station to manage the communication of the base stations with the UE 110. The base station 120 includes a core network interface 270 that the base station manager 266 configures to exchange user-plane and control-plane data with core network functions and entities.

User Plane and Control Plane Signaling

Figure 3:
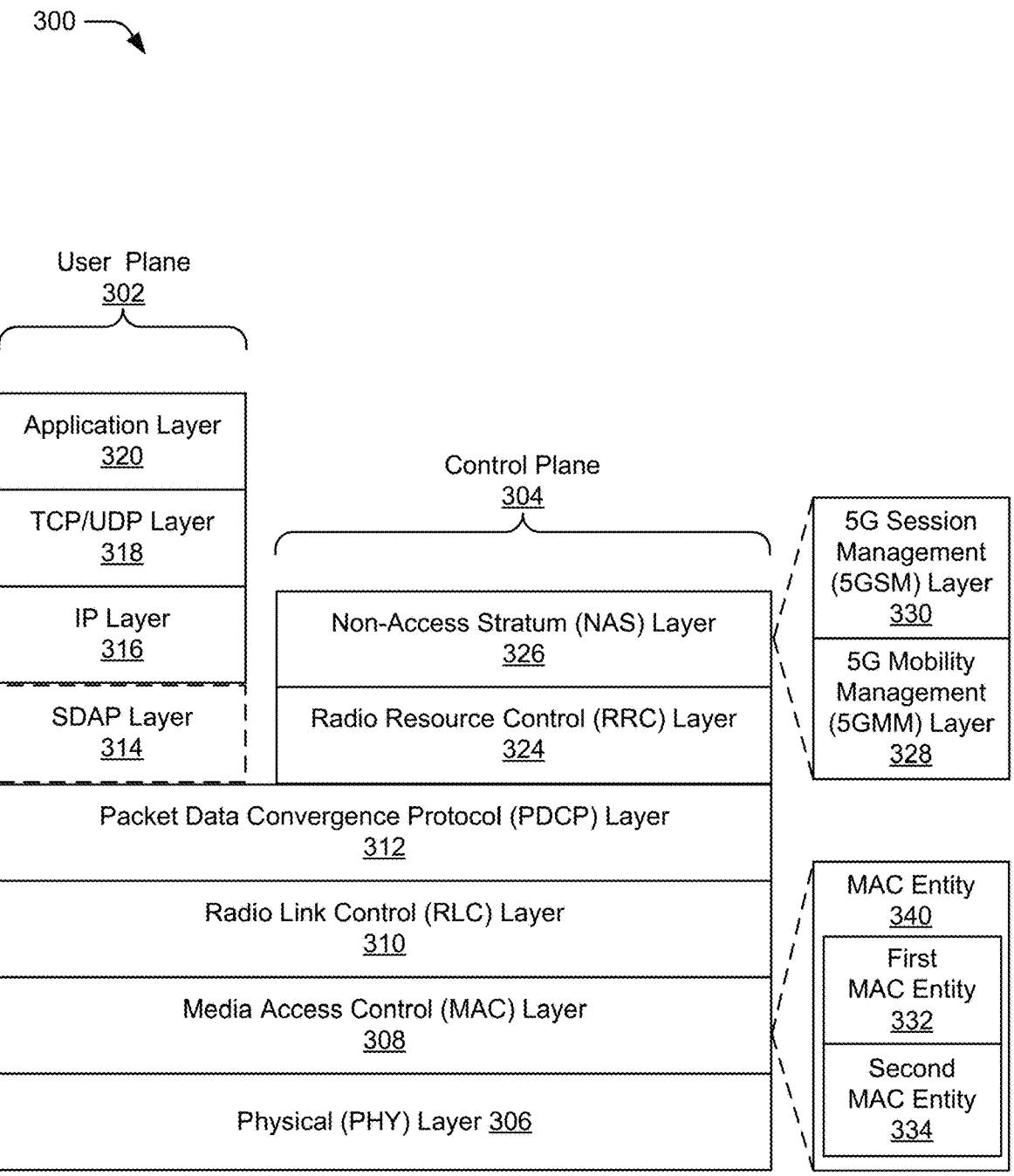
FIG. 3 illustrates an example block diagram of a wireless network stack model in which various aspects of preventing inadvertent idle mode for a UE in multi-node connectivity environments can be implemented.

FIG. 3 illustrates an example block diagram of a wireless network stack model 300 (stack 300). The stack 300 characterizes a communication system for the example environment 100 (illustrated in FIG. 1), in which various aspects of preventing inadvertent idle mode for a UE 110 in multi-node connectivity environments can be implemented. The stack 300 includes a user plane 302 and a control plane 304. Upper layers of the user plane 302 and the control plane 304, share common lower layers in the stack 300. Wireless devices, such as the UE 110 or base station 120, implement each layer as an entity for communication with another device using the protocols defined for the layer. For example, a UE 110 uses a Packet Data Convergence Protocol (PDCP) entity to communicate to a peer PDCP entity in a base station 120 using the PDCP.

The shared lower layers include a physical layer 306 (PHY layer 306), a Media Access Control layer 308 (MAC layer 308), a Radio Link Control layer 310 (RLC layer 310), and a Packet Data Convergence Protocol layer 312 (PDCP layer 312). The PHY layer 306 provides hardware specifications for devices that communicate with each other. As such, the PHY layer 306 establishes how devices connect to each other, assists in managing how communication resources are shared among devices, and the like.

The MAC layer 308 specifies how data is transferred between devices. Generally, the MAC layer 308 provides a way in which data packets being transmitted are encoded and decoded into bits as part of a transmission protocol. For a UE 110 configured for multi-node connectivity, the UE 110 includes a suitable MAC entity 340 configured to the UE 110. For example, in dual connectivity, the MAC entity 340 includes a first MAC entity 332 for the MCG and a second MAC entity 334 for the SCG. The UE 110 communicates with a first wireless network through the first MAC entity 332 and communicates with a second wireless network through the second MAC entity 334.

In an example, the UE 110 includes a first MAC entity 332 for communicating with an E-UTRA network and a second MAC entity 334 for communicating with a 5G NR network. The UE 110 connects, in dual connectivity, to a first base station 122 through a first MAC entity 332 and to a second base station 121 through a second MAC entity 334. The base station 122 provides access to a master cell group (e.g., an E-UTRA wireless network) and the base station 123 provides access to a secondary cell group (e.g., a 5G NR wireless network). The UE 110 connects to the E-UTRA wireless network through the first MAC entity 332 and connects to the NR wireless network through the second MAC entity 334.

In another example, the UE 110 includes a first MAC entity 332 for communicating with a 5G NR network and a second MAC entity 334 for communicating with an E-UTRA network. The UE 110 connects, in dual connectivity, to a first base station 122 through a first MAC entity 332 and to a second base station 121 through a second MAC entity 334. The base station 122 provides access to a master cell group (e.g., a 5G NR wireless network) and the base station 123 provides access to a secondary cell group (e.g., an E-UTRA wireless network). The UE 110 connects to the 5G NR wireless network through the first MAC entity 332 and connects to the E-UTRA wireless network through the second MAC entity 334.

In another example, the UE 110 includes a first MAC entity 332 for communicating with a 5G NR network and a second MAC entity 334 for communicating with a non-5G NR wireless network. The UE 110 connects, in dual connectivity, to a first base station 122 through a first MAC entity 332 and to a second base station 121 through a second MAC entity 334. The base station 122 provides access to a master cell group (e.g., a 5G NR wireless network) and the base station 123 provides access to a secondary cell group (e.g., a non-5G NR wireless network). The UE 110 connects to the 5G NR wireless network through the first MAC entity 332 and connects to the non-5G NR wireless network through the second MAC entity 334.

In another example, the UE 110 includes a first MAC entity 332 for communicating with a non-5G NR network and a second MAC entity 334 for communicating with a 5G NR wireless network. The UE 110 connects, in dual connectivity, to a first base station 122 through a first MAC entity 332 and to a second base station 121 through a second MAC entity 334. The base station 122 provides access to a master cell group (e.g., a non-5G NR wireless network) and the base station 123 provides access to a secondary cell group (e.g., a 5G NR wireless network). The UE 110 connects to the non-5G NR wireless network through the first MAC entity 332 and connects to the 5G NR wireless network through the second MAC entity 334.

In another example, the UE 110 includes a first MAC entity 332 for communicating with a first 5G NR network and a second MAC entity 334 for communicating with a second 5G NR wireless network. The UE 110 connects, in dual connectivity, to a first base station 122 through a first MAC entity 332 and to a second base station 121 through a second MAC entity 334. The base station 122 provides access to a master cell group (e.g., a first 5G NR wireless network) and the base station 123 provides access to a secondary cell group (e.g., a second 5G NR wireless network). The UE 110 connects to the first 5G NR wireless network through the first MAC entity 332 and connects to the second 5G NR wireless network through the second MAC entity 334.

In some cases, such as for EN-DC, NGEN-DC, and NE-DC, an E-UTRA RLC layer and an NR RLC layer are used (see RLC layer 310 in FIG. 3). The RLC layer 310 provides data transfer services to higher layers in the stack 300. Generally, the RLC layer 310 provides error correction, packet segmentation and reassembly, and management of data transfers in various modes, such as acknowledged, unacknowledged, or transparent modes. In some cases, such as for EN-DC, an E-UTRA PDCP layer and an NR PDCP layer may be used (see RLC layer 310 in FIG. 3). The PDCP layer 312 provides data transfer services to higher layers in the stack 300. Generally, the PDCP layer 312 provides transfer of user plane 302 and control plane 304 data, header compression, ciphering, and integrity protection.

Above the PDCP layer 312, the stack 300 splits into the user-plane stack 302 and the control-plane stack 304. Layers of the user plane 302 include an optional Service Data Adaptation Protocol layer 314 (SDAP layer 314), an Internet Protocol layer 316 (IP layer 316), a Transmission Control Protocol/User Datagram Protocol layer 318 (TCP/UDP layer 318), and an application layer 320, which transfers data using the wireless link 106. The optional SDAP layer 314 is present in 5G NR networks. The SDAP layer 314 maps a Quality of Service (QoS) flow for each data radio bearer and marks QoS flow identifiers in uplink and downlink data packets for each packet data session. The IP layer 316 specifies how the data from the application layer 320 is transferred to a destination node. The TCP/UDP layer 318 is used to verify that data packets intended to be transferred to the destination node reached the destination node, using either TCP or UDP for data transfers by the application 320. In some implementations, the user plane 302 may also include a data services layer (not illustrated) that provides data transport services to transport application data, such as IP packets including web-browsing content, video content, image content, audio content, or social media content, and so forth.

The control plane 304 includes a Radio Resource Control layer 324 (RRC layer 324) and a Non-Access Stratum layer 326 (NAS layer 326). The RRC layer 324 establishes and releases connections and radio bearers, broadcasts system information, or performs power control. The RRC layer 324 also controls a resource control state of the UE 110 and causes the UE 110 to perform operations according to the resource control state. Example resource control states include a connected mode (e.g., an RRC connected mode, which is also referred to as an RRC_CONNECTED state) or a disconnected radio resource control state, such as an inactive state (e.g., an RRC inactive mode, which is also referred to as an RRC_INACTIVE state) and an idle state (e.g., an RRC idle mode, which is also referred to as an RRC_IDLE state). In general, if the UE 110 is in the connected mode at a radio resource control layer, the connection with the base station 120 is active. In the RRC inactive state, the connection with the base station 120 is suspended. If the UE 110 is in the idle mode at the radio resource control layer, the connection with the base station 120 is released. Generally, the RRC layer 324 supports 3GPP access but does not support non-3GPP access (e.g., WLAN communications). As noted herein, the RRC layer 324 may act to implement techniques for preventing inadvertent idle mode for a UE 110 in multi-node connectivity environments.

The NAS layer 326 provides support for mobility management (e.g., using a Fifth Generation Mobility Management layer 328 (5GMM layer 328) and packet data bearer contexts (e.g., using a Fifth Generation Session Management layer 330 (5GSM layer 330) between the UE 110 and entities or functions in the core network, such as the Access and Mobility Management Function 152 (AMF 152) of the 5GC 150, or the Mobility Management Entity 162 (MME 162), or the like. The NAS layer 326 supports both 3GPP access and non-3GPP access.

In the UE 110, each layer in both the user plane 302 and the control plane 304 of the stack 300 interacts with a corresponding peer layer or entity in a base station 120, a core network entity or function, and/or a remote service, to support user applications and control operation of the UE 110 in the RAN 140 (e.g., NR RAN 141, E-UTRAN 142).

Preventing Inadvertent Idle Mode

Various techniques, methods, devices, systems, and apparatuses are described herein for preventing inadvertent idle mode for a UE in multi-node connectivity environments. To communicate wirelessly with a network, the UE 110 may establish a connection to the network through at least one node (e.g., a base station 120, a serving cell) that supports the 5GC 150. In some situations, the UE 110 can use multi-node connectivity to connect to multiple nodes at a time (e.g., base station 121, base station 123). By connecting to multiple nodes, the UE 110 can realize performance improvements in data throughput, mobility robustness, and/or load balancing. The multiple nodes can be associated with the same radio access technology (RAT) or different RATs.

In multi-node connectivity, the UE 110 may transmit to and receive data from a first base station (e.g., base station 121) on at least one first carrier frequency and may transmit to and receive data from a second base station (e.g., base station 123) on at least one second carrier frequency. One of the base stations (e.g., base station 121) may be a master node and the other base station (e.g., base station 123) may be a secondary node. The at least one first carrier frequency and the at least one second carrier frequency may or may not overlap. The use, herein, of "multi-node connectivity" means connectivity by the UE 110 with two or more nodes, unless the context clearly dictates otherwise. Dual connectivity is an example of multi-node connectivity.

Different types of multi-node connectivity include multi-RAT dual connectivity (MR-DC), new-radio dual connectivity (NR-DC), and dual connectivity. MR-DC includes E-UTRA-NR dual connectivity (EN-DC), NG-RAN E-UTRA-NR dual connectivity (NGEN-DC), and NR-E-UTRA dual connectivity (NE-DC). With MR-DC, the UE 110 can connect to the 5GC 150 using the base stations 121 and 122, either of which can operate as the master node or the secondary node. In EN-DC, the UE 110 connects to an LTE evolved Node B (eNB) master node and a 5G NR Next Generation Node B (gNB) secondary node. In NGEN-DC, the UE 110 connects to an LTE eNB master node and a 5G NR gNB secondary node. In NE-DC, the UE 110 connects to a 5G NR gNB master node and an LTE eNB secondary node. In NR-DC (also referred to as NR-NR DC), the UE 110 connects to 5G NR gNB master node and a 5G NR gNB secondary node. For example, with the NR-DC, the UE 110 can connect to the 5GC using the base stations 121 and 123.

For example, the base station 123 (illustrated in FIG. 1) may be the master node and the base station 121 (illustrated in FIG. 1) may be the secondary node. In such a configuration, the UE 110 can be referred to as being in multi-node connectivity (e.g., dual connectivity) with the base station 121 (e.g., a first 5G-NR base station) and the base station 123 (e.g., a second 5G-NR base station), where both the base station 121 and the base station 123 provide 5G NR access to the 5GC 150.

In another example, the base station 123 may be the master node and base station 122 may be the secondary node. In such a configuration, the UE 110 can be referred to as being in multi-node connectivity (e.g., dual connectivity) with the base station 122 (e.g., an E-UTRA base station) providing E-UTRA access to the EPC 160 through MME 162 and the base station 123 (e.g., a 5G NR base station) providing 5G NR access to the 5GC 150 through the AMF 152. By way of example, the master node can be in E-UTRA communication with an E-UTRA node through an E-UTRA MAC entity. Also by example, the secondary node can be in 5G NR communication with an NR node (base station) through an NR MAC entity. As another example, the master node can be in 5G NR communication with an NR node (base station) through an NR MAC entity, and the secondary node can be in E-UTRA communication with an E-UTRA node through an E-UTRA MAC entity.

In another example, the master node implements a 5G NR wireless communication protocol, and the secondary node implements a wireless communication protocol other than a 5G NR protocol. In another example, the master node implements a wireless communication protocol other than a 5G NR protocol, and the secondary node implements a 5G NR wireless communication protocol. In another example, the master node implements a 5G NR wireless communication protocol, and the secondary node implements a 5G NR wireless communication protocol.

In a radio protocol architecture, the use of a radio bearer (RB) depends on how the radio bearer is setup. A radio bearer may be a data radio bearer (DRB) for a user plane data transmission and/or reception. A radio bearer may be a signaling radio bearer (SRB) for a control plane data transmission and/or reception. A DRB configuration may include at least one of a DRB identity, a packet data convergence protocol (PDCP) configuration, a radio link control (RLC) configuration, a logical channel identity, or a logical channel configuration (e.g., priority and/or logical channel group). An SRB configuration may include at least one of an SRB identity, the RLC configuration, or the logical channel configuration.

In multi-node connectivity, there may be three types of radio bearers: a master cell group (MCG) bearer, a secondary cell group (SCG) bearer, and a split bearer. The MCG bearer may utilize radio protocols located at the master node to use radio resources (e.g., time and frequency resources) of the master node. The SCG bearer may utilize radio protocols located at the secondary node to use radio resources of the secondary node. The split bearer may utilize protocols located at both the master node and the secondary node to use both the radio resources of the master node and the secondary node. The split bearer may be an MCG split bearer or an SCG split bearer. A DRB may be the MCG bearer, the SCG bearer, or the split bearer. In aspects, an SRB is configured as the MCG bearer or as the split bearer.

In multi-node connectivity, the UE 110 is configured with a plurality of Media Access Control (MAC) entities (e.g., a first MAC entity for the master cell group (MCG) and a second MAC entity for the secondary cell group (SCG)). For example, in dual connectivity (e.g., MR-DC), the UE 110 includes a first MAC entity 332 and a second MAC entity 334. The UE 110 uses the first MAC entity 332 to communicate with the master node (e.g., base station 123) and the second MAC entity 334 to communicate with the secondary node (e.g., base station 122). In aspects, the master node is a gNB, a Next Generation eNB (ng-eNB), or an eNB and the secondary node is a gNB, an ng-eNB, or an eNB.

Multi-Node Connectivity Establishment

Figure 4:
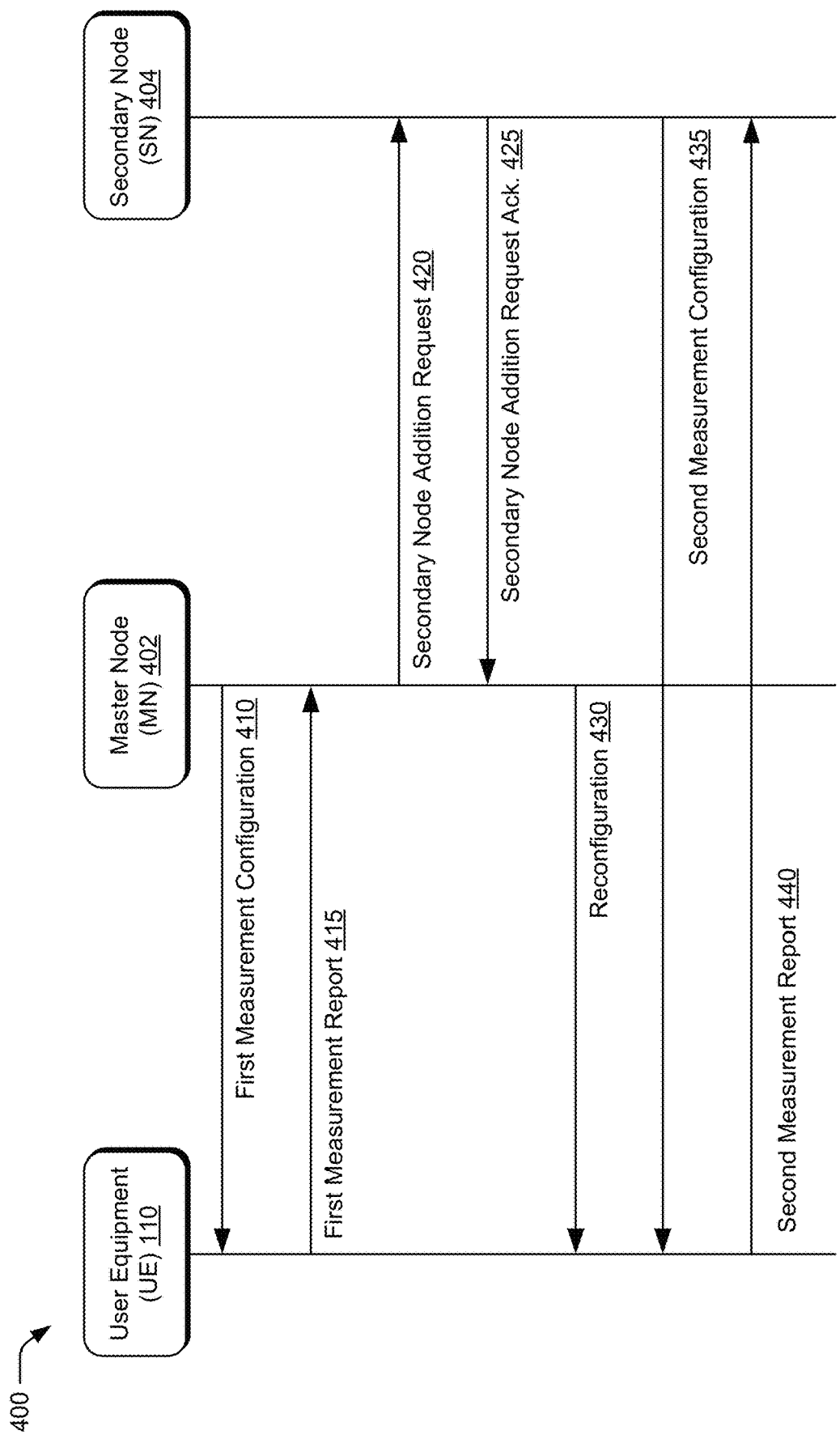
FIG. 4 illustrates example data and control transactions between entities for establishing multi-node connectivity.

FIG. 4 illustrates example data and control transactions 400 between entities for establishing multi-node connectivity. As discussed above with respect to FIG. 3, the UE 110 includes suitable MAC entities (e.g., a first MAC entity for the master cell group, a second MAC entity for the secondary cell group). The master node 402 implements a first wireless communication protocol and the secondary node 404 implements a second wireless communication protocol. The first and second wireless communication protocols may be the same wireless communication protocol or different wireless communication protocols, as described above.

In this example, the master node 402 transmits a first measurement configuration message 410 on the first SRB to the UE 110. The UE 110 transmits a first measurement report message 415 on the first SRB to the master node 402 in response to the first measurement configuration message 410. In response to receiving the first measurement report message 415 and to establish a connection with multi-node connectivity, the master node 402 configures the UE 110 to connect to the secondary node 404 through a Secondary Node Addition procedure. The Secondary Node Addition procedure is initiated by the master node 402 transmitting a radio resource control (RRC) message (e.g., a Secondary Node Addition request message 420) to the secondary node 404, and the secondary node 404 responds with a Secondary Node Addition request acknowledge message 425. A Secondary Node Addition request message 420 includes one or more SCG configurations that enable the UE 110 to communicate with the secondary node 404. The master node 402 transmits, on the first SRB, a reconfiguration message 430 (e.g., an RRC reconfiguration message, an RRC connection reconfiguration message) to forward the SCG configuration to the UE 110. Both the UE 110 and the master node 402 store the SCG configuration provided by the secondary node 404. In response to the reconfiguration message 430, the UE 110 sets up a second SRB. The secondary node 404 may transmit a second measurement configuration message 435 on the second SRB to the UE 110 while the UE 110 is in multi-node connectivity with the master node 402 and the secondary node 404. The UE 110 transmits a second measurement report message 440 to the secondary node 404 on the second SRB in response to receiving the second measurement configuration.

Dual-Data Inactivity Timer

In one implementation, a UE 110, which is in multi-node connectivity with a master node and a secondary node, utilizes a dual-data inactivity timer (e.g., the data inactivity timer(s) 218 of FIG. 2) for multiple MAC entities. In aspects, the dual-data inactivity timer is a multi-data inactivity timer configured for utilization with three or more MAC entities.

In aspects, an actor of the UE 110 (e.g., the connectivity manager 216 of FIG. 2) monitors communications (e.g., data) for both MAC entities (e.g., the first MAC entity 332 and the second MAC entity 334). If the UE 110 determines that, for a period of time (a time period), no data is being sent or received through any of the monitored MAC entities, then the UE 110 releases dedicated resources configured by the base station 120 and enters into an idle mode at the radio resource control layer (e.g., RRC_IDLE).

The UE 110 is configured to start or restart the dual-data inactivity timer whenever at least one of the first MAC entity 332 or the second MAC entity 334 transmits a MAC Service Data Unit (SDU) for a logical channel (LCH) (e.g., DTCH logical channel, DCCH logical channel, CCCH logical channel), or at least one of the first MAC entity 332 or the second MAC entity 334 receives a MAC SDU for an LCH (e.g., DTCH logical channel, DCCH logical channel). In aspects, the UE 110 is configured to start or restart the dual-data inactivity timer whenever a Protocol Data Unit (PDU) is sent or received from at least one of the first MAC entity 332 or the second MAC entity 334.

In multi-node connectivity, when the UE 110 is in a connected mode at a radio resource control layer (e.g., RRC_CONNECTED), the master node 402 or at least one secondary node 404 may configure the UE 110 with a data inactivity monitoring functionality, for example by configuring a dual-data inactivity timer (DualDataInactivityTimer) for a plurality of MAC entities (e.g., first MAC entity 332, second MAC entity 334). In aspects, at least one of the master node 402 or the secondary node 404 may configure the UE 110 to use the dual-data inactivity timer through RRC messages, as described below regarding FIG. 5.

When the dual-data inactivity timer is configured, a connectivity manager 216 may monitor communications (e.g., data) for one or more MAC entities (e.g., the first MAC entity 332 and the second MAC entity 334) and the UE 110 (e.g., the connectivity manager 216) may start or restart the dual-data inactivity timer if any monitored MAC entity receives a MAC SDU for an LCH or if any monitored MAC entity transmits a MAC SDU for an LCH. For example, the UE 110 starts or restarts the dual-data inactivity timer if the first MAC entity 332 communicates a first MAC SDU for a first LCH from the master node. In another example, the UE 110 starts or restarts the dual-data inactivity timer if the second MAC entity 334 communicates a second MAC SDU for a second LCH from the secondary node.

As used herein, the LCH may be a Dedicated Traffic Channel (DTCH), a Dedicated Control Channel (DCCH), a Common Control Channel (CCCH), a Sidelink Broadcast Control Channel (SBCCH), a Sidelink Traffic Channel (STCH), a Multicast Control Channel (MCCH), a single cell MCCH (SC-MCCH), Multicast Traffic Channel (MTCH), or a single cell MTCH (SC-MTCH). As used herein, the DTCH may be at least one of an E-UTRA DTCH or a, NR DTCH. As used herein, the DCCH may be at least one of an E-UTRA DCCH or an NR DCCH. As used herein, the CCCH may be at least one of an E-UTRA CCCH or an NR CCCH.

In one example, the UE 110 neither starts nor restarts the dual-data inactivity timer if the UE 110 communicates a MAC SDU for an LCH other than the LCH from the master node or the secondary node. In aspects, the other LCH may be a CCCH. In another example, the other LCH may be a broadcast control channel (BCCH), a paging control channel (PCCH), an SBCCH, an STCH, an MCCH, an SC-MCCH, an MTCH, or an SC-MTCH. In aspects, the UE 110 neither starts nor restarts the dual-data inactivity timer if the UE 110 communicates a MAC SDU for a CCCH from the master node or the secondary node.

In aspects, the dual-data inactivity timer expires if none of the MAC entities receive or transmit a MAC SDU for an LCH within a time period (e.g., the duration of the dual-data inactivity timer). Responsive to the expiration of the data inactivity timer, the lower layers indicate the expiry of the timer to the upper layers. Upon receiving the expiry indication from the lower layers, the UE 110 transitions from a connected mode at a radio resource control layer (e.g., the RRC connected state) to an a idle mode at a radio resource control layer (e.g., the RRC idle state) and the UE 110 initiates an RRC connection release procedure releasing the RRC connections for all nodes (e.g., the master node and the secondary node).

Figure 5:
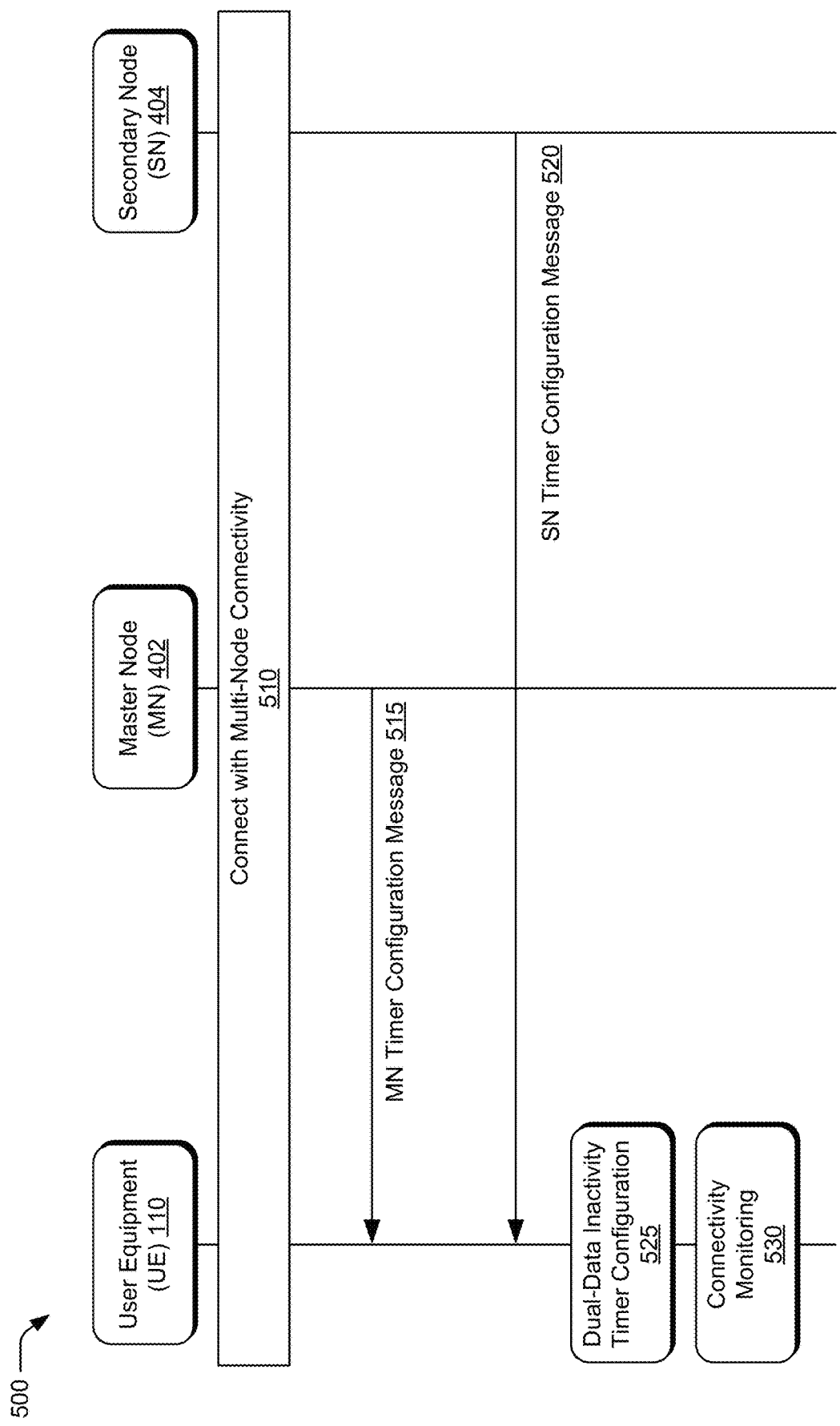
FIG. 5 illustrates example data and control transactions between entities for preventing inadvertent idle mode for a UE in multi-node connectivity environments by using a single dual-data inactivity timer for one or more Media Access Control entities.

FIG. 5 illustrates example data and control transactions 500 between entities for preventing inadvertent idle mode for UE in multi-node connectivity environments by using a single dual-data inactivity timer for a plurality of MAC entities. As described above with respect to FIG. 4, at 510 the UE 110 connects through multi-node connectivity to a master node (MN) 402 (e.g., base station 123) and at least one secondary node (SN) 404 (e.g., base station 121 or base station 122).

In an implementation, the UE 110 may be configured by an RRC message to enable data inactivity monitoring (e.g., use a dual-data inactivity timer 218) by at least one of the master node 402 or the secondary node 404. For example, the master node 402 may transmit an RRC message (e.g., a Master Node (MN) timer configuration message 515) to the UE 110 to configure the UE 110 to use the dual-data inactivity timer. The MN timer configuration message 515 may include at least one of a timer value (duration) of the dual-data inactivity timer or parameter(s) for the UE 110 to derive a duration of a timer value for the dual-data inactivity timer. If not included in the MN timer configuration message 515, the UE 110 can use a default timer value for the dual-data inactivity timer. The master node 402 may transmit the MN timer configuration message 515 using a signaling radio bearer (SRB) (e.g., SRB1) between the UE 110 and the master node 402. The master node 402 may transmit the MN timer configuration message 515 using at least one of the radio resources of the master node 402 or the radio resources of the secondary node 404.

In another implementation, the secondary node 404 transmits an RRC message (e.g., a secondary node (SN) timer configuration message 520) including a timer value (duration) of the dual-data inactivity timer, to the UE 110 to configure the UE 110 to use the dual-data inactivity timer. The SN timer configuration message 520 may include at least one of a timer value for the dual-data inactivity timer or parameter(s) for the UE 110 to derive a timer value for the dual-data inactivity timer. If not included in the SN timer configuration message 520, the UE 110 may use a default timer value for the dual-data inactivity timer. The secondary node 404 may transmit the SN timer configuration message 520 using an SRB (e.g., SRB3) between the UE 110 and the secondary node 404.

The UE 110 can utilize a dual data inactivity timer configuration procedure 525 to configure, set up, and or initiate a dual-data inactivity timer (e.g., data inactivity timer(s) 218 of FIG. 2). The UE 110 utilizes a connectivity monitoring procedure 530 to monitor communications (e.g., data) for one or more MAC entities. The UE 110 can utilize the connectivity monitoring procedure 530 to monitor data for the MAC entity for master node 402 (e.g., the first MAC entity 332) and to monitor data for the MAC entity for secondary node 404 (e.g., the second MAC entity 334). In at least some aspects, the connectivity monitoring procedure 530 is implemented by the connectivity manager 216 of FIG. 2 to configure a radio resource control layer (e.g., RRC layer 324 of FIG. 3) and elements in a Media Access Control layer (e.g., a first MAC entity 332 and second MAC entity 334 of the MAC layer 308 of FIG. 3) to perform connectivity monitoring.

Alternatively or additionally, the method may further comprise detecting a trigger that initiates a communication status. For example, a trigger indicating that at least one of the master node 402 and/or the secondary node 404 is in communication with the UE 110, and/or a trigger indicating that at least one of the master node 402 or the secondary node 404 is not in communication with the UE 110. Responsive to detecting the trigger, the method includes performing one or more operations comprising: starting or restarting a dual-data inactivity timer or transitioning to idle mode. Responsive to determining a communication of data on a monitored MAC entity (e.g., receiving a MAC SDU for an LCH, transmitting a MAC SDU for an LCH), the UE 110 starts or restarts the dual-data inactivity timer. The dual-data inactivity timer expires if none of the MAC entities receive or transmit a MAC SDU for an LCH within a time period (e.g., the duration of the dual-data inactivity timer). Responsive to the expiration of the data inactivity timer, the lower layers indicate the expiry of the dual-data inactivity timer to the upper layers. Upon receiving the expiry indication from the lower layers, the UE 110 transitions from a connected mode at a radio resource control layer to an idle mode at a radio resource control layer, and the UE 110 initiates an RRC connection release procedure releasing the RRC connections for all nodes (e.g., the master node 402 and the secondary node 404).

Separate Data Inactivity Timer for Each MAC Entity

In another implementation, the UE 110 is in a connected mode at a radio resource control layer (e.g., RRC_CONNECTED) with the master node 402 and at least one secondary node 404. An actor of the UE 110 monitors communications (e.g., data) for one or more MAC entities of the UE 110 through use of a plurality of separate data inactivity timers (e.g., the data inactivity timer(s) 218 of FIG. 2). For example, the UE 110 (e.g., the connectivity manager 216 of FIG. 2) monitors for communications of data for a plurality of MAC entities (e.g., first MAC entity 332 and a second MAC entity 334) to determine if the UE 110 is communicating with at least one of a MAC SDU for a first LCH from the master node 402 or a MAC SDU for a second LCH from the secondary node 404.

Upon the UE 110 determining, for a period of time (duration) set at the dual-data inactivity timer, that no data is being sent or received through any of the monitored MAC entities, all the data inactivity timers expire. Upon all the data inactivity timers expiring, the UE 110 releases base station resources (RRC connections) associated with the multi-node connectivity and transitions to an idle mode at a radio resource control layer (e.g., RRC_IDLE). If less than all of the data inactivity timers expire (e.g., if a first data inactivity timer expires but a second data inactivity timer does not expire), then the UE 110 does not release the base station resources, and the UE 110 remains in a connected mode at a radio resource control layer (e.g., RRC_CONNECTED).

In the implementation, the UE 110 utilizes a separate data inactivity timer (e.g., data inactivity timer 218 of FIG. 2) for each MAC entity 340. For example, a first data inactivity timer for the first MAC entity 332 (e.g., an E-UTRA MAC entity) and a second data inactivity timer for the second MAC entity 334 (e.g., a 5G NR MAC entity). The UE 110 is configured to start or restart a data inactivity timer (e.g., data inactivity timer 218 of FIG. 2) whenever a MAC SDU for a logical channel is sent or received from the MAC entity (e.g., first MAC entity 332, second MAC entity 334) associated with the data inactivity timer. For example, in dual connectivity, when the UE 110 is in a connected mode at a radio resource control layer (e.g., RRC_CONNECTED), the master node 402 or the secondary node 404 may configure the UE 110 with a data inactivity monitoring functionality, for example by configuring a dual-data inactivity timer for one or more MAC entities (e.g., first MAC entity 332, second MAC entity 334). The UE 110 uses the data inactivity timer to control data inactivity operation.

In aspects, at least one of the master node 402 or the secondary node 404 configures the UE 110 to use a data inactivity timer (e.g., data inactivity timer 218 of FIG. 2). When a data inactivity timer is configured, the connectivity manager 216 monitors communications (e.g., data) for the associated MAC entity 340 (e.g., the first MAC entity 332, the second MAC entity 334). The UE 110 (e.g., the connectivity manager 216) starts or restarts the data inactivity timer if the monitored MAC entity receives a MAC SDU for an LCH or if the monitored MAC entity transmits a MAC SDU for an LCH. For example, the UE 110 starts or restarts the data inactivity timer if the first MAC entity 332 communicates a first MAC SDU for a first LCH from the master node 402.

Alternatively or additionally, the method may further comprise the UE detecting a trigger that initiates a communication status. For example, a trigger indicating that at least one of the master node or the secondary node is in communication with the UE, and/or a trigger indicating that at least one of the master node or the secondary node is not in communication with the UE. Responsive to detecting the trigger, the method includes the UE performing one or more operations comprising: starting or restarting a dual-data inactivity timer or transitioning to idle mode.

Upon the UE 110 determining, for a period of time, that no data is sent or received through any of the monitored MAC entities 340, the data inactivity timers 218 expire. Responsive to the expiration of the data inactivity timer, the lower layers indicate the expiry of the data inactivity timer to the upper layers. Upon receiving the expiry indication from the lower layers, the UE 110 transitions from a connected mode at a radio resource control layer (e.g., RRC_CONNECTED) to an idle mode at a radio resource control layer (e.g., RRC_IDLE) and the UE 110 initiates an RRC connection release procedure releasing the RRC connections for all nodes (e.g., the master node 402 and the secondary node 404). If less than all the data inactivity timers expire, then the UE 110 does not release base station resources, and the UE 110 remains in the radio resource connected mode. Through the utilization of a dual-data inactivity timer, upon one of the MAC entities (associated with a first node) failing to receive or transmit a MAC SDU for an LCH within a time period, the UE does not need to release all resources with the active second node, thereby preventing an inadvertent idle mode.

Figure 6:
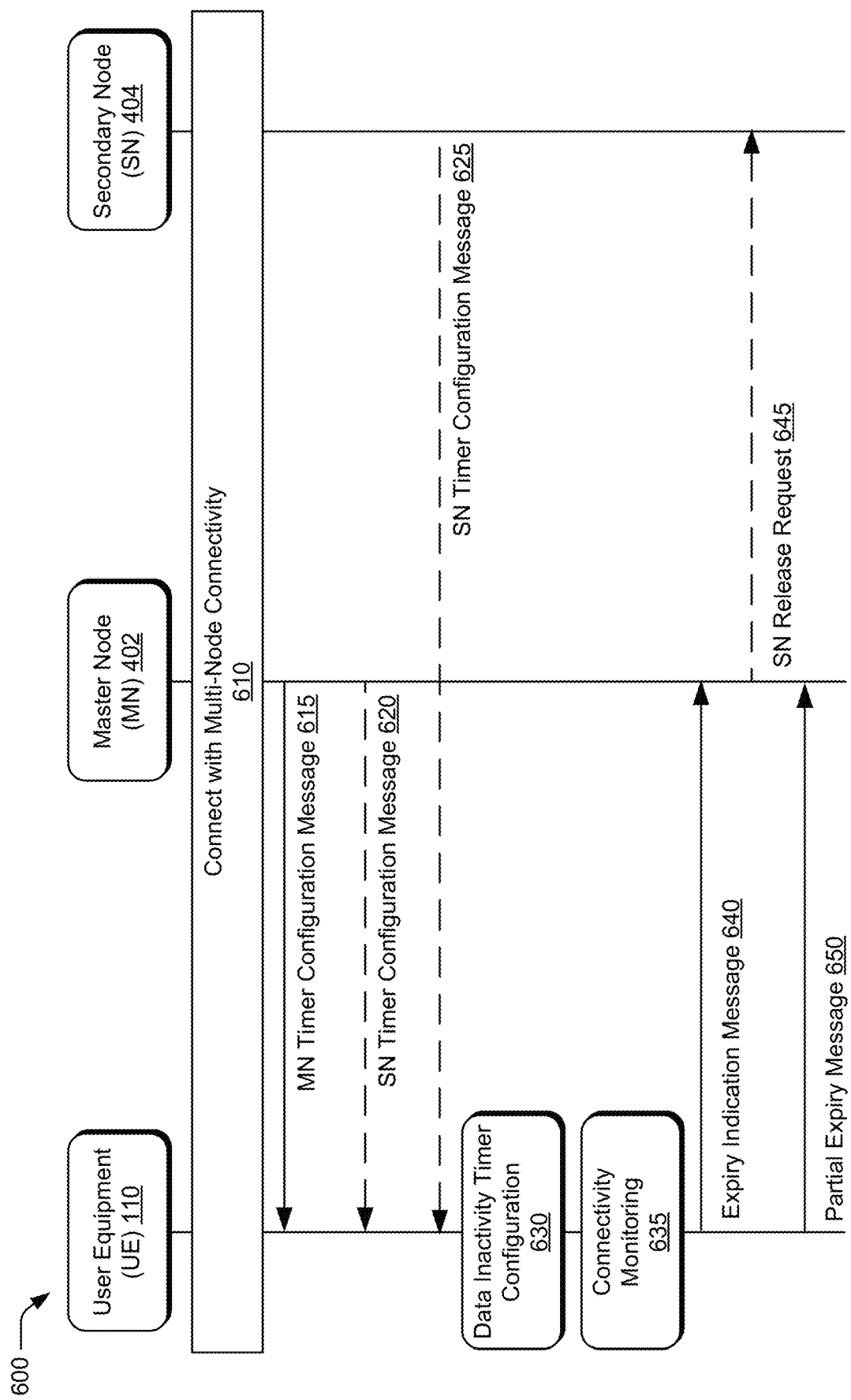
FIG. 6 illustrates example data and control transactions between entities for preventing inadvertent idle mode for a UE in multi-node connectivity environments by using separate data inactivity timers for each Media Access Control entity.

FIG. 6 illustrates example data and control transactions 600 between entities for preventing inadvertent idle mode for a UE in a multi-node connectivity environment by using separate data inactivity timers for each MAC entity 340. As described above with respect to FIG. 4, at 610 the UE 110 connects through multi-node connectivity to the master node 402 (e.g., base station 123) and the at least one secondary node 404 (e.g., base station 121 or base station 122).

In aspects, at least one of the master node 402 or the secondary node 404 may configure the UE 110 by an RRC message to enable data inactivity monitoring (e.g., use one or more data inactivity timers). In one example, the master node 402 transmits an RRC message (e.g., a Master Node (MN) timer configuration message 615) to the UE 110 to configure the UE 110 to use a first data inactivity timer for a first MAC entity 332. The MN timer configuration message 615 may include a timer value (duration) for the data inactivity timer or parameter(s) for the UE 110 to derive a timer value for the first data inactivity timer. If not included in the MN timer configuration message 615, the UE 110 may use a default timer value for the first data inactivity timer. The master node 402 may transmit the MN timer configuration message 615 using a signaling radio bearer (SRB) (e.g., SRB1) between the UE 110 and the master node 402. The master node 402 may transmit the MN timer configuration message 615 using master node radio resources or secondary node radio resources.

The master node 402 may transmit the SN timer configuration message 620 using a signaling radio bearer (SRB) (e.g., SRB1) between the UE 110 and the master node 402. The master node 402 may transmit the SN timer configuration message 620 using master node radio resources or secondary node radio resources. The SN timer configuration message 620 may include a timer value (duration) of the data inactivity timer or parameter(s) for the UE 110 to derive a timer value of the second data inactivity timer. If not included, the UE 110 may use a default timer value for the second data inactivity timer.

The secondary node 404 optionally transmits an RRC message (e.g., an SN timer configuration message 625) to the UE 110 to configure the UE 110 to use a second data inactivity timer for a second MAC entity 334. The secondary node 404 may transmit the SN timer configuration message 625 using a signaling radio bearer (SRB) (e.g., SRB3) between the UE 110 and the secondary node 404. The secondary node 404 may transmit the SN timer configuration message 625 using master node radio resources or secondary node radio resources. For example, the secondary node 404 may transmit the SN timer configuration message 625 to the UE 110 using an SRB (e.g., SRB1) between the UE 110 and the master node 402. The SN timer configuration message 625 may include a timer value (duration) of the data inactivity timer or parameter(s) for the UE 110 to derive a timer value of the second data inactivity timer. If not included, the UE 110 may use a default timer value for the second data inactivity timer.

The UE 110 can utilize a data inactivity timer configuration procedure 630 to configure, set up, and or initiate a plurality of separate data inactivity timers (e.g., data inactivity timer(s) 218 of FIG. 2). The UE 110 utilizes a connectivity monitoring procedure 635 to monitor communications (e.g., data) for the MAC entities 340. The UE 110 can utilize the connectivity monitoring procedure 635 to monitor data for the MAC entity for master node 402 (e.g., the first MAC entity 332) and to monitor data for the MAC entity for secondary node 404 (e.g., the second MAC entity 334). In at least some aspects, connectivity monitoring procedure 635 is implemented by the UE 110 utilizing the connectivity manager 216 of FIG. 2 to configure a radio resource control layer (e.g., RRC layer 324 of FIG. 3) and elements in a Media Access Control layer (e.g., a first MAC entity 332 and second MAC entity 334 of the MAC layer 308 of FIG. 3) to perform connectivity monitoring.

Responsive to determining that a MAC entity 340 receives a MAC SDU for an LCH, the UE 110 starts or restarts the data inactivity timer for that MAC entity 340. In aspects, the UE 110 does not start or restart the data inactivity timer for a second MAC entity 334 responsive to determining that a first MAC entity 332 received a MAC SDU for a logical channel LCH. Responsive to determining that a MAC entity transmits a MAC SDU for an LCH, the UE 110 starts or restarts the data inactivity timer for that MAC entity 340. In aspects, the UE 110 does not start or restart the data inactivity timer for a second MAC entity 334 responsive to determining that a first MAC entity 332 transmitted a MAC SDU for an LCH.

A data inactivity timer expires if the MAC entity 340 associated with the data inactivity timer does not receive or transmit a MAC SDU within a time period. Responsive to the expiration of a data inactivity timer, the lower layers indicate the expiry of the timer to the upper layers. In aspects, the UE 110 transmits an expiry indication message 640 to the master node 402 if a data inactivity timer (e.g., the first data inactivity timer, the second data inactivity timer) expires. The UE 110 may disconnect from the inactive node (e.g., master node 402, secondary node 404) responsive to the data inactivity timer expiring or may remain connected to the inactive node responsive to the data inactivity timer expiring. The UE 110 may disconnect from an inactive secondary node 404 without transmitting an expiry indication message 640 to the master node 402.

Optionally, the master node 402 transmits a Secondary Node (SN) release request message 645 to the secondary node 404 to request the secondary node 404 to release a secondary cell group (SCG) configuration for the UE 110. In response to receiving the SN release request message 645, the secondary node 404 releases the SCG configuration (i.e., releases the secondary node 404 resources configured to the UE 110).

Optionally, the UE 110 transmits a partial expiry indication message 650 to the master node 402 if one of the data inactivity timers expires and the other data inactivity timer does not expire. For example, the partial expiry indication message 650 indicating that the first data inactivity timer expires (the UE 110 has data inactivity with the master node 402 (or in/on MCG)) and the second data inactivity timer has not expired (the UE 110 has data activity with the secondary node 404 (or in/on SCG)). The UE 110 may disconnect from an inactive secondary node 404 without transmitting a partial expiry indication message 650 to the master node 402.

If the UE 110 disconnects from the secondary node 404, the UE 110 may release a secondary cell group (SCG) configuration associated with the secondary node 404 or the UE 110 may keep (store) the SCG configuration associated with the secondary node 404. If the UE 110 keeps the secondary cell group (SCG) configuration associated to the secondary node 404, the UE 110 may consider a time alignment timer associated to the SCG configuration or associated to the secondary node 404 has expired.

Upon receiving expiry indications from the lower layers regarding each data inactivity timer, the UE 110 transitions from the connected mode (e.g., RRC_CONNECTED state) to an idle mode (e.g., RRC_IDLE state) and the UE 110 initiates an RRC connection release procedure releasing the RRC connections for all nodes (e.g., the master node and the secondary node).

In one example, the UE 110 uses a first MAC entity 332 to communicate with the master node 402 and uses a second MAC entity 334 to communicate with the secondary node 404. The first MAC entity 332 starts or restarts the first data inactivity timer if the first MAC entity 332 receives a MAC SDU for a first LCH from the master node 402. The first MAC entity 332 neither starts nor restarts the first data inactivity timer if the first MAC entity 332 communicates a MAC SDU for an LCH from the secondary node 404. The second MAC entity 334 starts or restarts the second data inactivity timer if the second MAC entity 334 communicates a MAC SDU for a second LCH from the secondary node 404. The second MAC entity 334 neither starts nor restarts the first data inactivity timer if the first MAC entity 332 communicates a MAC SDU for an LCH from the master node 402.

In aspects, the UE 110 (e.g., the first MAC entity 332) neither starts nor restarts the first data inactivity timer if the UE 110 (e.g., the first MAC entity 332) communicates a MAC SDU for an LCH other than the LCH from the master node 402. In aspects, the UE 110 (e.g., the first MAC entity 332) neither starts nor restarts the first data inactivity timer if the UE 110 (e.g., the first MAC entity 332) transmits a MAC SDU for a CCCH. In aspects, the UE 110 (e.g., the second MAC entity 334) neither starts nor restarts the second data inactivity timer if the UE 110 (e.g., the second MAC entity 334) communicates a MAC SDU for an LCH other than the LCH from the secondary node 404.

Through the utilization of a separate data inactivity timer for each MAC entity, upon a data inactivity timer expiring due to an inactive first node, the UE does not need to release all resources with the active second node, thereby preventing an inadvertent idle mode.

Data Inactivity Timer in Single Connectivity

In additional implementations, the techniques restrict the use of a data inactivity timer (e.g., the data inactivity timer(s) 218 of FIG. 2) in single connectivity environments (e.g., where the UE 110 is in single connectivity and not in multi-node connectivity). In a single connectivity case, the UE has a single MAC entity (e.g., MAC entity 340). The UE 110 utilizes a connectivity monitoring procedure to monitor communications (e.g., data) for MAC entities to determine if one or more connections are in use.

For example, responsive to determining that one connection is in use (i.e., single MAC entity case (single connectivity)), the UE 110 enables data inactivity monitoring and the UE 110 uses the data inactivity timer. In such an implementation, the UE 110 may start or restart a data inactivity timer and perform operations as described in one or more of the processes described above. In aspects, the UE 110 is in a connected mode at a radio resource control layer (e.g., RRC_CONNECTED) and transitions to an idle mode at a radio resource control layer (e.g., RRC_IDLE) when the data inactivity timer expires. In aspects, to configure the UE 110 to enable the data inactivity monitoring, the master node 402 may transmit at least one of a master node (MN) timer configuration message or a secondary node (SN) timer configuration message to the UE 110 as described above with respect to FIG. 5 and/or FIG. 6.

In aspects, responsive to determining that more than one connection is in use, the UE 110 does not start or restart a data inactivity timer and/or the UE 110 disables data inactivity monitoring. In other aspects, if the UE 110 starts the data inactivity timer and the data inactivity timer expires, the UE 110 takes not action in response to the expiry. In some aspects, where the UE 110 disables inactivity monitoring, the UE 110 may disable the data inactivity monitoring if the UE 110 does not receive a timer configuration message from the base station (e.g., master node 402) that configures the UE 110 to use the data inactivity timer, such as the MN Timer Configuration Message 515 described above with respect to FIG. 5. To configure the UE 110 to disable the data inactivity monitoring, the master node 402 may transmit an RRC message to configure the UE 110 to disable the data inactivity monitoring. The RRC message may indicate releasing the configuration. In another implementation, the master node 402 configures a UE 110 to enable data inactivity monitoring if the UE 110 connects to only one base station, and the master node 402 configures the UE 110 to disable data inactivity monitoring if the UE 110 connects to more than one base station. In aspects, the master node 402 does not configure a data inactivity timer for a UE 110 configured for multi-node connectivity.

In a further implementation, the UE 110 ignores the expiration of one or more data inactivity timers when the UE is in multi-node connectivity with a master node 402 and a secondary node 404. For example, if the UE 110 is configured for dual connectivity (i.e., two MAC entities case), the UE 110 (in a connected mode at a radio resource control layer (e.g., RRC_CONNECTED)) does not transition to an idle mode at a radio resource control layer (e.g., RRC_IDLE) when the data inactivity timer expires.

Example Methods

Example methods 700-900 are described with reference to FIGS. 7-9 in accordance with one or more aspects for preventing inadvertent idle mode for a UE in multi-node connectivity environments. The order in which the method blocks are described is not intended to be construed as a limitation, and any number of the described method blocks can be combined in any order to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage media that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 7:
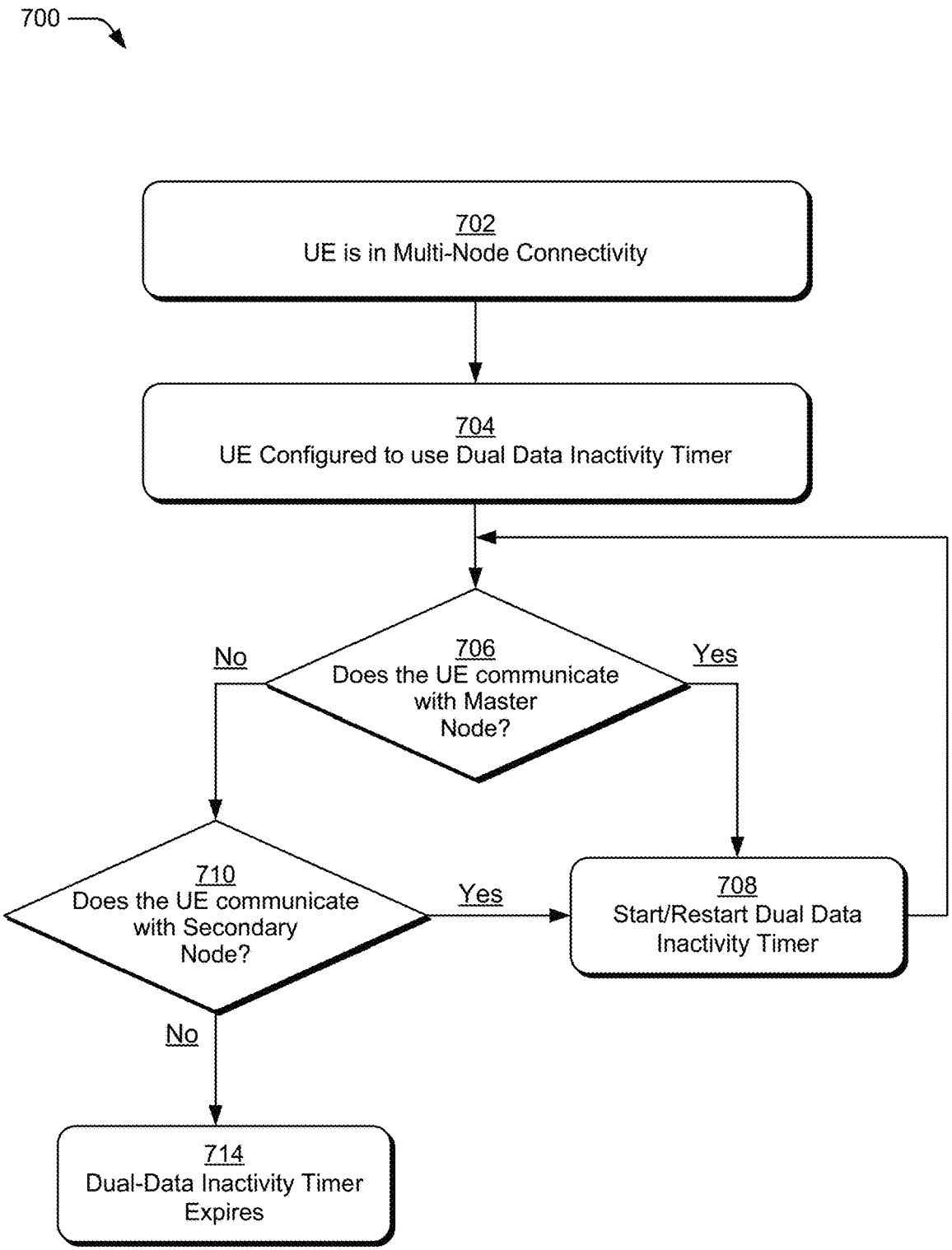
FIG. 7 illustrates an example method for preventing inadvertent idle mode for a UE in multi-node connectivity environments.

FIG. 7 illustrates an example method 700 for preventing inadvertent idle mode for a UE in multi-node connectivity environments. In the aspect illustrated in method 700, the UE 110 is in multi-node connectivity through a first MAC entity 332 with a master node (e.g., master node 402) and through a second MAC entity 334 with a secondary node (e.g., secondary node 404). In method 700, the UE 110 is in a connected mode at a radio resource control layer (e.g., RRC_CONNECTED) and monitors, through an actor of the UE 110, communications (e.g., data) for both the first and second MAC entities. Thus, the UE 110 monitors data generally, which can be for either MAC entity. Only if the UE 110 does not send or receive data for a time period for the combination of both MAC entities will this method 700 cause release of base station resources and entry into an idle mode (e.g., RRC_IDLE).

At block 702, a user equipment (UE) is in a multi-node connectivity configuration with the master node and the secondary node. For example, the UE 110 is in a multi-node connectivity configuration with the master node 402 and the secondary node 404 of FIGS. 5-7. Note that this can be assumed or determined, such as by a radio resource control.

At block 704, the UE is configured to use a dual-data inactivity timer. For example, the master node 402 or the secondary node 404 configures the UE 110 to use the dual-data inactivity timer using the MN timer configuration message 515 (described with respect to FIG. 5) or the SN timer configuration message 520 (described with respect to FIG. 5), respectively. The dual-data inactivity timer is a timer that expires when both the first MAC entity 332 and the second MAC entity 334 are inactive (e.g., no data or SDU transmitted or received for a period of time (e.g., the duration of the dual-data inactivity timer) from either the first MAC entity 332 or the second MAC entity 334).

At block 706, an actor of the UE determines if the UE communicates with the master node 402. For example, a connectivity manager 216 (of FIG. 2) of the UE 110 determines if the UE 110 transmits or receives a MAC SDU for a logical channel through the master node 402 of FIG. 4. As noted, communication through either the master node 402 or the secondary node 404 is sufficient to cause the dual-data inactivity timer to not expire; here, method 700 illustrates the determination of communication with the master node 402 separately from the determination of communication with a secondary node 404. Following a "Yes" determination at block 706, the method proceeds to block 708. Following a "No" determination at block 706, the method proceeds to block 710.

At block 708, the UE starts or restarts the dual-data inactivity timer and returns to block 706. For example, the UE 110 starts or restarts the dual-data inactivity timer if the UE transmits or receives a MAC SDU for a logical channel through the master node 402 and returns to block 706.

At 710, an actor of the UE determines if the UE communicates with the secondary node 404. For example, the connectivity manager 216 (of FIG. 2) of the UE 110 determines if the UE 110 transmits or receives a MAC SDU for a logical channel through the secondary node 404. Following a "Yes" determination at 710, the method proceeds to block 706. Following a "No" determination, the method proceeds to block 712.

At block 712, the dual-data inactivity timer expires. Upon expiration of the dual-data inactivity timer, the UE 110 releases base station resources and transitions from the connected mode at a radio resource control layer (e.g., RRC_CONNECTED) to an idle mode at a radio resource control layer (e.g., RRC_IDLE).

In aspects, the processes of block 706 and 710 can run in parallel.

Alternatively or additionally, the method may further comprise detecting a trigger that initiates a communication status. For example, a trigger indicating that at least one of the master node or the secondary node is in communication with the UE, and/or a trigger indicating that at least one of the master node or the secondary node is not in communication with the UE. Responsive to detecting the trigger, the method includes performing one or more operations comprising: starting or restarting a dual-data inactivity timer or transitioning to idle mode.

Figure 8:
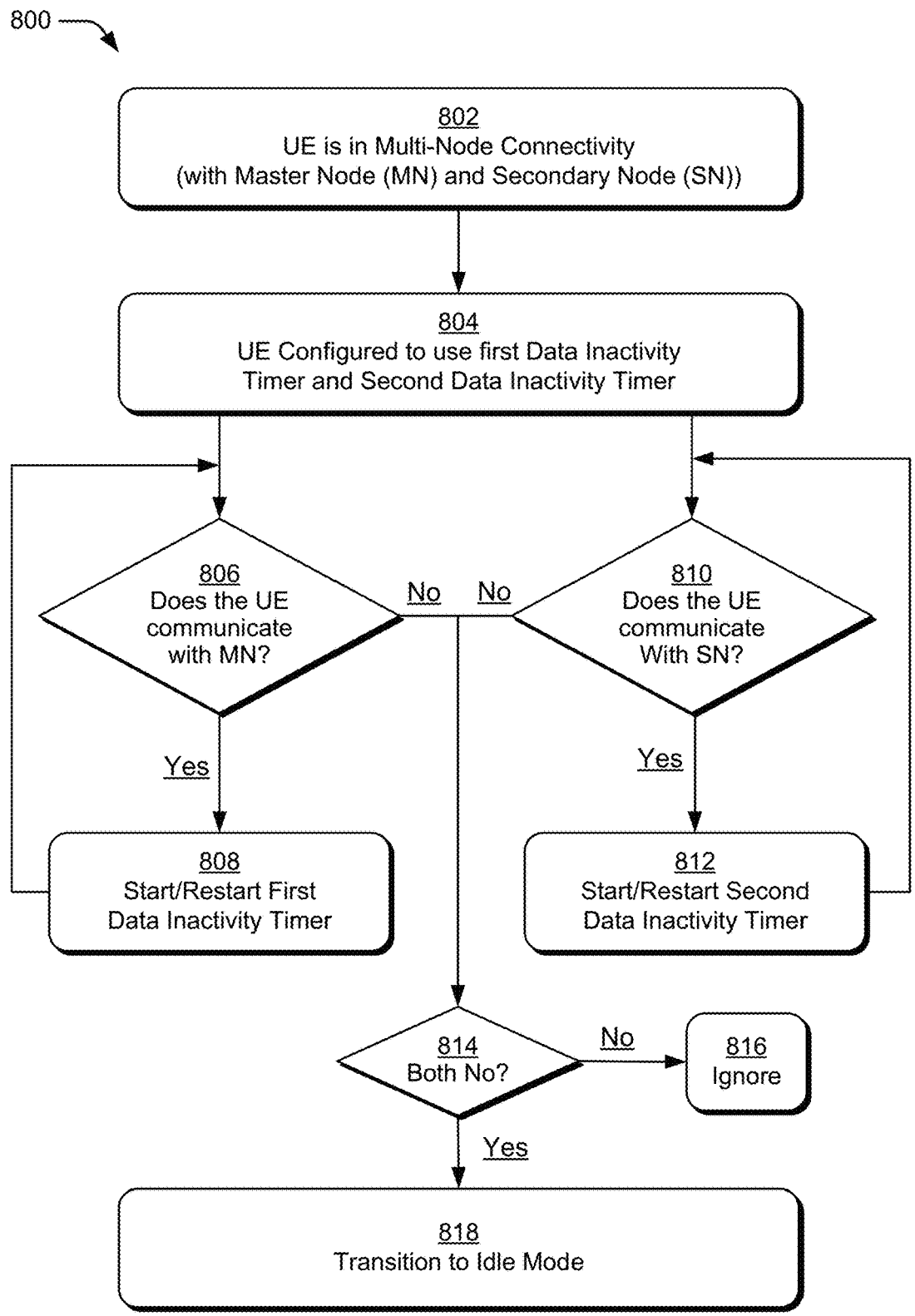
FIG. 8 illustrates another example method for preventing inadvertent idle mode for a UE in multi-node connectivity environments.

FIG. 8 illustrates another example method 800 for preventing inadvertent idle mode for a UE in multi-node connectivity environments. In the aspect illustrated in method 800, the UE 110 is in multi-node connectivity, through a first MAC entity 332 with a master node (e.g., master node 402) and through a second MAC entity 334 with a secondary node (e.g., secondary node 404). In method 800, the UE 110 is in a connected mode at a radio resource control layer (e.g., RRC_CONNECTED) and monitors, through an actor of the UE 110, communications (e.g., data) for both the first and second MAC entities. Thus, the UE 110 monitors data generally, which can be for either MAC entity. Only if the UE 110 does not send or receive data for a time period for the combination of both MAC entities will this method 800 cause release of base station resources and entry into an idle mode (e.g., RRC_IDLE).

Method 800 is one example way to prevent inadvertent entry into an idle mode, here through two separate data inactivity timers. Thus, in addition to the conventional data inactivity timer for the first MAC entity 332 (e.g., configured for an E-UTRA MAC entity), method 800 utilizes a second data inactivity timer for the second MAC entity 334 (e.g., configured for an NR MAC entity). In method 800, the UE enters an idle mode when both the first and second data inactivity timers expire. Thus, the UE, may receive from the first MAC 332 entity an indication that the first MAC entity's timer has expired, but the UE will not act on that indication unless the second MAC entity's timer has also expired. This prevents a case where a data inactivity timer expires and then, prior to the other of the data inactivity timers also expiring, releasing base station resources and entry into an idle mode (e.g., RRC_IDLE).

At block 802, the UE is in a multi-node connectivity configuration with a master node 402 and a secondary node 404. For example, the UE 110 is in a multi-node connectivity configuration with the master node 402 and the secondary node 404 of FIG. 5. Note that this can be assumed or determined, such as by radio resource control.

At block 804, the UE is configured to use a first data inactivity timer and a second data inactivity timer. For example, the master node 402 and/or the secondary node 404 configure the UE 110 to use a first data inactivity timer and a second data inactivity timer, such as through use of a MN timer configuration message 615 (described with respect to FIG. 6) and/or an SN timer configuration message 620 (described with respect to FIG. 6), respectively. A data inactivity timer is a timer that expires when a MAC entity 340 is inactive (e.g., no data or SDU transmitted or received for a period of time (e.g., the duration of the dual-data inactivity timer) from the MAC entity 340).

At block 806, an actor of the UE 110 determines if the UE 110 transmits or receives a MAC SDU for a logical channel through the master node 402, such as by determining a duration of data inactivity through the master node 402. For example, a connectivity manager 216 (of FIG. 2) of the UE 110 determines if the UE 110 transmits or receives a MAC SDU for a logical channel through the master node 402. Following a "Yes" determination at block 806, the method proceeds to block 808.

At block 808, the UE starts or restarts the first data inactivity timer and returns to block 806. Following a "No" determination, the method proceeds to block 814. While not illustrated, this determination of a duration of inactivity can simply be based on the expiration of the data inactivity timer for the respective node.

At block 810, an actor of the UE determines if the UE transmits or receives a MAC SDU for a logical channel through the secondary node, such as by determining a duration of data inactivity through the secondary node. For example, a connectivity manager 216 (of FIG. 2) of the UE 110 determines if the UE 110 transmits or receives a MAC SDU for a logical channel through the secondary node 404 of FIG. 5. Following a "Yes" determination, the method proceeds to block 812.

At block 812, the method starts or restarts the second data inactivity timer and returns to block 810. Following a "No" determination, the method proceeds to block 814. While not illustrated, this determination of a duration of inactivity can be based on the expiration of the data inactivity timer for a node.

At block 814, the UE determines whether both the first and second nodes are inactive. For example, the UE 110 determines if both the first data inactivity timer and the second data inactivity timer have expired. Following a "No" determination, the method proceeds to block 816 to ignore the result and the method may proceed back to blocks 806 and 810 to further monitor communications. Following a "Yes" determination (expiration of the first data inactivity timer and the second data inactivity timer), the method proceeds to block 818.

At block 818, the UE 110 releases base station resources and transitions from the connected mode at a radio resource control layer (e.g., RRC_CONNECTED) to an idle mode at a radio resource control layer (e.g., RRC_IDLE).

Alternatively or additionally, the method may further comprise detecting a trigger that initiates a communication status. For example, a trigger indicating that at least one of the master node or the secondary node is in communication with the UE, and/or a trigger indicating that at least one of the master node or the secondary node is not in communication with the UE. Responsive to detecting the trigger, the method includes performing one or more operations comprising: starting or restarting a data inactivity timer or transitioning to idle mode.

Figure 9:
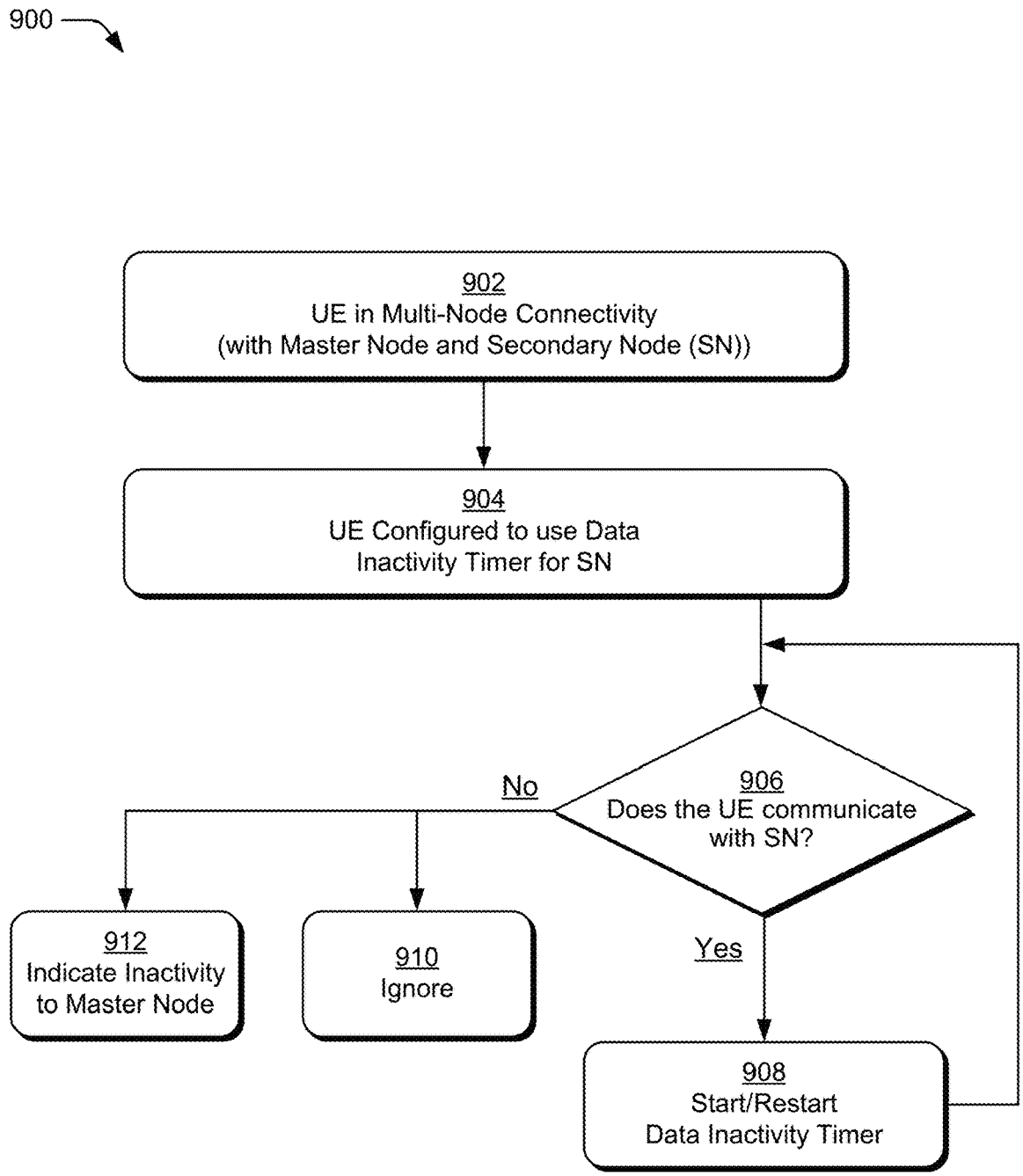
FIG. 9 illustrates yet another example method for preventing inadvertent idle mode for a UE in multi-node connectivity environments.

FIG. 9 illustrates another example method 900 for preventing inadvertent idle mode for a UE in multi-node connectivity environments. In the aspect illustrated in method 900, the UE 110 is in multi-node connectivity (e.g., dual connectivity), through a first MAC entity 332 with a master node (e.g., master node 402) and through a second MAC entity 334 with a secondary node (e.g., secondary node 404). In method 900, the UE 110 is in a connected mode at a radio resource control layer (e.g., RRC_CONNECTED) and monitors, through an actor of the UE 110, communications (e.g., data) for the second MAC entity 334.

At block 902, the UE is in a multi-node connectivity configuration with a master node and a secondary node. For example, the UE 110 is in a multi-node connectivity configuration with the master node 402 and the secondary node 404 of FIG. 6. Note that this can be assumed or determined, such as by radio resource control.

At block 904, the UE is configured to use a data inactivity timer for the secondary node. For example, the master node 402 or the secondary node 404 configure the UE to use a data inactivity timer for the secondary node 402, such as using the MN timer configuration message 615 (described with respect to FIG. 6) or the SN timer configuration message 620 (described with respect to FIG. 6), respectively.

At block 906, an actor of the UE determines if the UE transmits or receives a MAC SDU for a logical channel through the secondary node. For example, a connectivity manager 216 (of FIG. 2) of the UE 110 determines if the UE 110 transmits or receives a MAC SDU for a logical channel through the secondary node 404.

Following a "Yes" determination, the method proceeds to block 908. At block 908, the UE starts or restarts the data inactivity timer. After starting or restarting the first data inactivity timer, the method returns to block 906.

Following a "No" determination, the method proceeds to at least one of block 910 or block 912. At block 910, the UE ignores the determination that the UE is not communicating with the secondary node 404 and takes no action. At block 912, the UE indicates the inactivity to the master node 402. For example, the UE 110 sends an expiry indication message 640 (of FIG. 6) to the master node 402. While not illustrated, this determination of a duration of data inactivity can simply be based on the expiration of the data inactivity timer for a node.

Although aspects for preventing inadvertent idle mode for a UE in multi-node connectivity environments have been described in language specific to features and/or methods, the subject of the appended claims is not necessarily limited to the specific features or methods described. Rather, the specific features and methods are disclosed as example implementations of the preventing inadvertent idle mode for a UE in multi-node connectivity environments, and other equivalent features and methods are intended to be within the scope of the appended claims. Further, various different aspects are described, and it is to be appreciated that each described aspect can be implemented independently or in connection with one or more other described aspects.

Conclusion

Although techniques for preventing inadvertent idle mode for a user equipment in multi-node connectivity environments have been described in language specific to features and/or methods, it is to be understood that the subject of the appended claims is not necessarily limited to the specific features or methods described. Rather, the specific features and methods are disclosed as example implementations of preventing inadvertent idle mode for a user equipment in multi-node connectivity environments.

What is claimed is:

1. A method for a user equipment (UE) in a multi-node connectivity environment, the method comprising the UE performing operations including:
    connecting, through multi-node connectivity, to a master node (MN) and a secondary node (SN), the UE including a first Media Access Control (MAC) entity for communicating with the MN and a second MAC entity for communicating with the SN, at least one of the MN or the SN comprising a Fifth Generation New Radio (5G NR) base station;
    operating in a connected mode at a radio resource control (RRC) layer;
    detecting a a reception of a first MAC Service Data Unit (SDU) for a logical channel (LCH) by the first MAC entity or the second MAC entity;
    starting or restarting a dual-data inactivity timer responsive to the detecting the reception of the first MAC SDU;
    prior to the dual-data inactivity timer expiring, detecting a transmission of a second MAC SDU for an LCH by the first MAC entity or the second MAC entity;
    starting or restarting the dual-data inactivity timer responsive to the detecting the transmission of the second MAC SDU; and
    responsive to the dual-data inactivity timer expiring:
        releasing the connections to both the MN and the SN; and
        transitioning from the connected mode at the RRC layer to an idle mode at the RRC layer.

2. The method of claim 1, wherein the dual-data inactivity timer expires if:
   none of the MAC entities receive a MAC SDU for an LCH within a duration set at the dual-data inactivity timer; and
   none of the MAC entities transmit a MAC SDU for an LCH within the duration.

3. The method of claim 1, further comprising the UE performing operations including:
   responsive to the dual-data inactivity timer expiring, sending, by a lower layer of the UE, an indication of the expiry of the dual-data inactivity timer to an upper layer of the UE.

4. The method of claim 3, further comprising the UE performing operations including:
   receiving, by the upper layer, the indication of the expiry of the dual-data inactivity timer; and
   responsive to the receiving of the indication of the expiry of the dual-data inactivity timer, performing the transitioning of the UE from the connected mode at an RRC layer to the idle mode at an RRC layer.

5. The method of claim 1, further comprising the UE performing operations including:
   responsive to the expiration of the dual-data inactivity timer, sending, by the lower layers of the UE, an indication of the expiry of the dual-data inactivity timer to an upper layer of the UE;
   receiving, by the upper layer, the indication of the expiry of the dual-data inactivity timer; and
   responsive to the receiving of the indication of the expiry of the dual-data inactivity timer, performing the transitioning of the UE from the connected mode at an RRC layer to the idle mode at an RRC layer.

6. The method of claim 1, further comprising the UE performing operations including:
   configurating a dual-data inactivity timer, comprising:
      receiving, from at least one of the MN or the SN, an RRC message that specifies a timer value; and
      setting a duration of the dual-data inactivity timer based on the timer value.

7. The method of claim 1, further comprising the UE performing operations including:
   configurating a dual-data inactivity timer, comprising:
      setting a duration of the dual-data inactivity timer based on a default timer value stored by the UE.

8. The method of claim 1, wherein the releasing of the connections comprises:
   initiating an RRC connection release procedure.

9. The method of claim 1, wherein detecting a first communication of data on at least one of the first MAC entity or the second MAC entity comprises:
   detecting a trigger that indicates a communication status, wherein the trigger indicates at least one of:
      the MN is in communication with the UE;
      the SN is in communication with the UE;
      the MN is not in communication with the UE; or
      the SN is not in communication with the UE.

10. The method of claim 1, wherein the UE neither starts nor restarts the dual-data inactivity timer if the UE communicates a MAC SDU for an LCH other than the LCH from the master node or the secondary node.

11. The method of claim 1, wherein the UE neither starts nor restarts the dual-data inactivity timer if the UE communicates a MAC SDU for a Common Control Channel from the master node or the secondary node.

12. A user equipment (UE) apparatus comprising:
   a processor;
   one or more transceivers; and
   a computer-readable storage media having stored thereon instructions that, responsive to execution by the processor, cause the processor to perform operations comprising:
      connect, through multi-node connectivity, to a master node (MN) and a secondary node (SN), the apparatus including a first Media Access Control (MAC) entity for communicating with the MN and a second MAC entity for communicating with the SN, at least one of the MN or the SN comprising a Fifth Generation New Radio (5G NR) base station;
      operate in a connected mode at a radio resource control (RRC) layer;
      detect a reception of a first MAC Service Data Unit (SDU) for a logical channel (LCH) by the first MAC entity or the second MAC entity;
      start or restart a dual-data inactivity timer responsive to the detecting the reception of the first MAC SDU;
      prior to the dual-data inactivity timer expiring, detect a transmission of a second MAC SDU for an LCH by the first MAC entity or the second MAC entity;
      start or restart the dual-data inactivity timer responsive to the detecting the transmission of the second MAC SDU; and
      responsive to the dual-data inactivity timer expiring:
         release the connections to both the MN and the SN; and
         transition from the connected mode at the RRC layer to an idle mode at the RRC layer.

13. The apparatus of claim 12, wherein responsive to the dual-data inactivity timer expiring, the processor performing operations comprising:
   sending, by a lower layer of the apparatus, an indication of the expiry of the dual-data inactivity timer to an upper layer of the apparatus.

14. The apparatus of claim 13, further comprising the processor performing operations comprising:
   receive, by the upper layer, the indication of the expiry of the dual-data inactivity timer; and
   responsive to the receiving of the indication of the expiry of the dual-data inactivity timer, performing the transition of the apparatus from the connected mode at an RRC layer to the idle mode at an RRC layer.

15. A method for a user equipment (UE) in a multi-node connectivity environment, the method comprising the UE performing operations including:
   connecting, through multi-node connectivity, to a master node (MN) and a plurality of secondary nodes (SN), the UE including a plurality of Media Access Control (MAC) entities for communicating with the MN and each of the plurality of SN, at least one of the MN or the SN comprising a Fifth Generation New Radio (5G NR) base station;
   operating in a connected mode at a radio resource control (RRC) layer;
   detecting a reception of a first MAC Service Data Unit (SDU) for a logical channel (LCH) by a first MAC entity or a second MAC entity;
   starting or restarting a multi-data inactivity timer responsive to the detecting the reception of the first MAC SDU;
   prior to the multi-data inactivity timer expiring, detecting a transmission of a second MAC SDU for an LCH by a MAC entity;

starting or restarting the multi-data inactivity timer responsive to the detecting the transmission of the second MAC SDU; and responsive to the multi-data inactivity timer expiring:
- releasing the connections to the MN and each of the plurality of SN; and
- transitioning from the connected mode at the RRC layer to an idle mode at the RRC layer.

16. The method of claim 15, wherein the multi-data inactivity timer expires if:
- none of the MAC entities receive a MAC SDU for an LCH within a duration set at the multi-data inactivity timer; and
- none of the MAC entities transmit a MAC SDU for an LCH within the duration.

17. The method of claim 16, wherein responsive to the multi-data inactivity timer expiring, the UE performing operations comprising:
- sending, by a lower layer of the UE, an indication of the expiry of the multi-data inactivity timer to an upper layer of the UE; and
- receiving, by the upper layer, the indication of the expiry of the multi-data inactivity timer; and
- responsive to the receiving of the indication of the expiry of the multi-data inactivity timer, performing the transitioning of the UE from the connected mode at an RRC layer to the idle mode at an RRC layer.

18. The method of claim 15, further comprising the UE performing operations including:
- configuring a dual-data inactivity timer, comprising:
  - receiving, from at least one of the MN or the SN, an RRC message that specifies a timer value; and
  - setting a duration of the dual-data inactivity timer based on the timer value.

19. The method of claim 15, further comprising the UE performing operations including:
- configuring a dual-data inactivity timer, comprising:
  - setting a duration of the dual-data inactivity timer based on a default timer value stored by the UE.

20. The method of claim 15, wherein the releasing of the connections comprises:
- initiating an RRC connection release procedure.

* * * * *